(12) United States Patent
Mori et al.

(10) Patent No.: US 12,258,081 B2
(45) Date of Patent: Mar. 25, 2025

(54) ROTATION ANGLE DETECTION DEVICE AND ELECTRIC POWER STEERING DEVICE INCLUDING SAME ROTATION ANGLE DETECTION DEVICE

(71) Applicant: Mitsubishi Electric Corporation, Tokyo (JP)

(72) Inventors: Tatsuya Mori, Tokyo (JP); Akira Furukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 778 days.

(21) Appl. No.: 17/417,290

(22) PCT Filed: Jan. 22, 2019

(86) PCT No.: PCT/JP2019/001736
§ 371 (c)(1),
(2) Date: Jun. 22, 2021

(87) PCT Pub. No.: WO2020/152761
PCT Pub. Date: Jul. 30, 2020

(65) Prior Publication Data
US 2022/0063715 A1    Mar. 3, 2022

(51) Int. Cl.
*B62D 5/00* (2006.01)
*B62D 5/04* (2006.01)

(52) U.S. Cl.
CPC .......... *B62D 5/0487* (2013.01); *B62D 5/0463* (2013.01)

(58) Field of Classification Search
CPC ............................ B62D 5/0487; B62D 5/0463
See application file for complete search history.

(56) References Cited

U.S. PATENT DOCUMENTS 5,710,509 A * 1/1998 Goto ................... G01D 5/2073
                                                        318/656
8,558,534 B2 * 10/2013 Tomita ................ B62D 5/0484
                                                        324/141

(Continued)

FOREIGN PATENT DOCUMENTS

JP        2008-273478 A      11/2008
JP        2013-205366 A  *  10/2013

(Continued)

OTHER PUBLICATIONS

International Search Report for PCT/JP2019/001736 dated Mar. 12, 2019 [PCT/ISA/210].

(Continued)

*Primary Examiner* — Mohamed Charioui
*Assistant Examiner* — Lynda Dinh
(74) *Attorney, Agent, or Firm* — Sughrue Mion, PLLC

(57) ABSTRACT

Provided is a rotation angle detection device including: an intermediate signal generation unit configured to generate an intermediate signal based on a product of a sine signal and a cosine signal which are based on a rotation angle of a rotating body; a first multiplication unit; and a first rotation angle calculation unit. The intermediate signal generation unit includes: a first multiplier configured to calculate the product of the sine signal and the cosine signal; and a first low-pass filter configured to remove frequency components equal to or higher than twice a frequency of fundamental waves of the sine signal and the cosine signal from an output of the first multiplier.

5 Claims, 15 Drawing Sheets

(56) References Cited

U.S. PATENT DOCUMENTS

| | | | |
|---|---|---|---|
| 2014/0036250 A1* | 2/2014 | Okada | G01B 7/14 |
| | | | 355/75 |
| 2014/0316733 A1* | 10/2014 | Mori | G01D 5/00 |
| | | | 702/94 |
| 2018/0252511 A1* | 9/2018 | Furukawa | H02P 6/10 |

FOREIGN PATENT DOCUMENTS

| | | |
|---|---|---|
| JP | 2014-032105 A | 2/2014 |
| WO | 2013/136612 A1 | 9/2013 |

OTHER PUBLICATIONS

Written Opinion for PCT/JP2019/001736 dated Mar. 12, 2019 [PCT/ISA/237].

* cited by examiner

ROTATION ANGLE DETECTION DEVICE AND ELECTRIC POWER STEERING DEVICE INCLUDING SAME ROTATION ANGLE DETECTION DEVICE

CROSS REFERENCE TO RELATED APPLICATIONS

This application is a National Stage of International Application No. PCT/JP2019/001736 filed Jan. 22, 2019.

TECHNICAL FIELD

The present invention relates to a rotation angle detection device, and more particularly, to a rotation angle detection device configured to detect a rotation angle of a rotating body based on a sine signal and a cosine signal. The present invention also relates to an electric power steering device including the rotation angle detection device.

BACKGROUND ART

As means for detecting a rotation angle of a rotating body, for example, a motor, a resolver, a magneto resistance (MR) sensor, and the like are widely used. In those means, a sine signal and a cosine signal are output based on the rotation angle of the rotation body. A rotation angle detection device detects the rotation angle of the rotating body based on the sine signal and the cosine signal (for example, see Patent Literature 1).

The rotation angle detect ion device described in Patent Literature 1 reads a value of the peak and a value of the valley of each of the sine signal and the cosine signal, and calculates center point correction values each from a difference between a middle point between the value of the peak and the value of the valley and a center point value determined in advance. The rotation angle detection device adds the center point correction value to each of the sine signal and the cosine signal to correct the sine signal and the cosine signal, and detects the rotation angle of the rotating body based on the corrected sine signal and cosine signal.

CITATION LIST

Patent Literature

[PT 1] JP 2008-273478 A

SUMMARY OF INVENTION

Technical Problem

However, the rotation angle detection device described in Patent Literature 1 does not have a measure to handle a case in which orthogonality between the sine signal and the cosine signal is low. A supplementary description is now given or the orthogonality between the sine signal and the cosine signal. When the phase difference between the sine signal and the cosine signal matches 90 degrees, it is defined that the sine signal and the cosine signal are orthogonal to each other, or have the orthogonality. Meanwhile, when the phase difference between the sine signal and the cosine signal does not match 90 degrees, it is defined that the sine signal and the cosine signal are not orthogonal to each other, or do not have the orthogonality. Moreover, a state in which the orthogonality is high means that the phase difference between the sine signal and the cosine signal is close to 90 degrees. A state in which the orthogonality is low means that the phase difference between the sine signal and the cosine signal is apart from 90 degrees.

In the rotation angle detection device described in Patent Literature 1, when the orthogonality between the sine signal and the cosine signal is low, an error occurs between the rotation angle detected by the rotation angle detection device and an actual rotation angle of the rotating body. As described below, this error is caused by frequency components twice as high as the frequency of fundamental waves of the sine signal and the cosine signal.

The error caused by the frequency components twice as high as the frequency of the fundamental waves of the sine signal and the cosine signal is hereinafter referred to as "rotation angle error of 2f." As described below, the rotation angle errors of 2f occur not only when the orthogonality between the sine signal and the cosine signal is low, but the rotation angle errors of 2f similarly occur also when, for example, the amplitude of the sine signal and the amplitude of the cosine signal are different from each other.

The present invention has been made in order to solve the above-mentioned problem, and has an object to provide a rotation angle detection device capable of suppressing rotation angle errors of 2f.

Solution to Problem

In order to solve the above-mentioned problem, according to one embodiment of the present invention, there is provided a rotation angle detection device including: an intermediate signal generation unit configured to generate an intermediate signal based on a product of a sine signal and a cosine signal which are based on a rotation angle of a rotating body; a first multiplication unit configured to multiply the intermediate signal by one of the sine signal or the cosine signal; an addition/subtraction unit configured to add the other one of the sine signal or the cosine signal and an output of the first multiplication unit to each other or to subtract the output of the first multiplication unit from the other one of the sine signal or the cosine signal; and a first rotation angle calculation unit configured to calculate the rotation angle of the rotating body based on the one of the sine signal or the cosine signal and an output of the addition/subtraction unit.

Further, according to another embodiment of the present invention, there is provided a rotation angle detection device including: an amplitude ratio calculation unit configured to calculate an amplitude ratio between a sine signal and a cosine signal which are based on a rotation angle of a rotating body, based on respective second powers of the sine signal and the cosine signal; a second multiplication unit configured to multiply the amplitude ratio by one of the sine signal or the cosine signal; and a second rotation angle calculation unit configured to calculate the rotation angle of the rotating body based on an output of the second multiplication unit and the other one of the sine sign-a or the cosine signal.

Advantageous Effects of Invention

The rotation angle detection device according to the present invention can suppress the rotation angle errors caused by the frequency components twice as high as the fundamental waves of the sine signal and the cosine signal, that is, the rotation angle errors of 2f.

DESCRIPTION OF EMBODIMENTS

Now, details of embodiments of a rotation angle detection device disclosed in the present application are described with reference to the accompanying drawings. It should be noted, however, that the embodiments described below are merely examples, and the present invention is not limited to those embodiments.

First Embodiment

Figure 1:
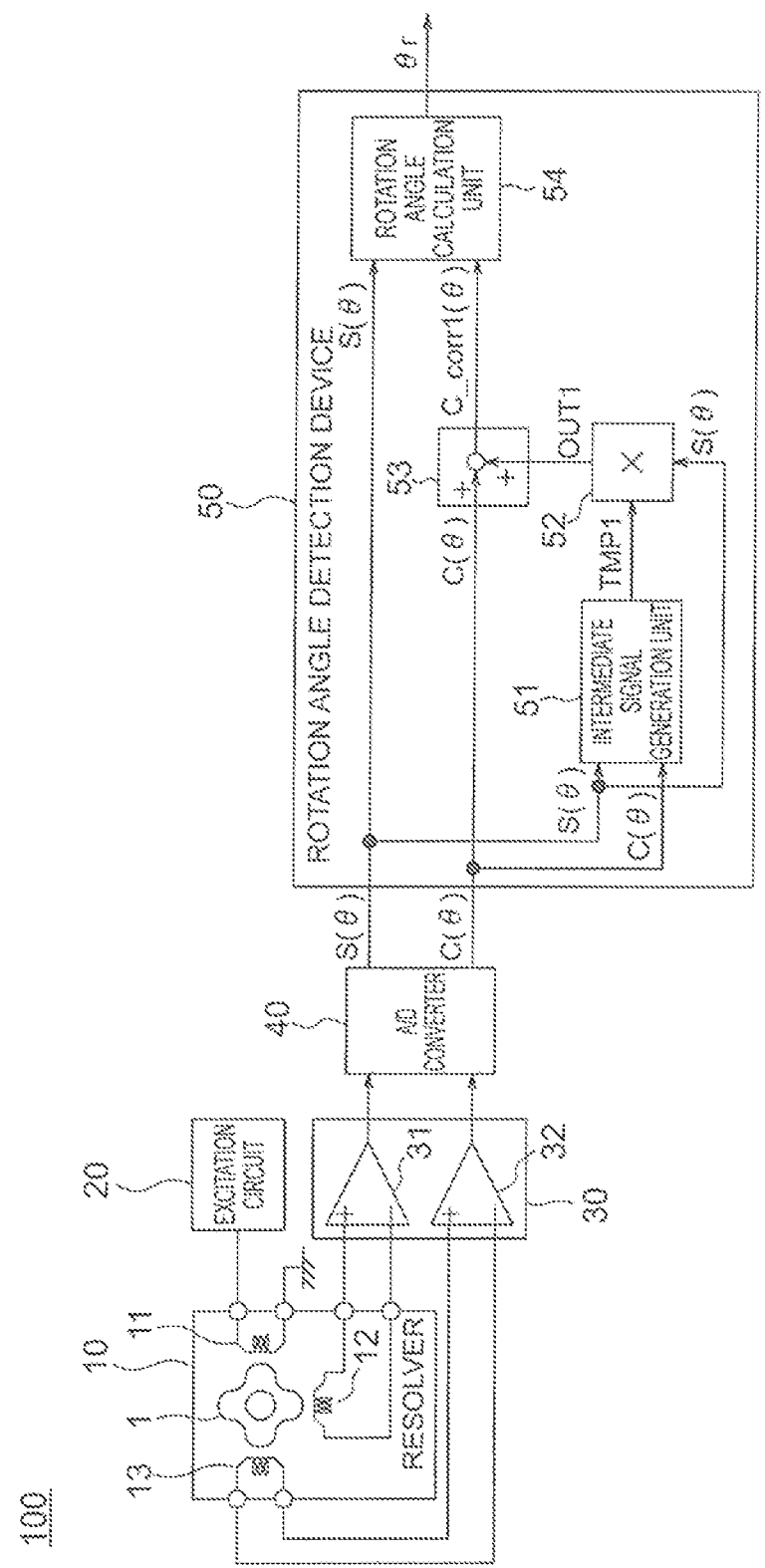
FIG. 1 is a block diagram for illustrating a configuration of a rotation angle detection system including a rotation angle detection device according to a first embodiment of the present invention.

FIG. 1 is a block diagram for illustrating a configuration of a rotation angle detection system 100 including a rotation angle detection device 50 according to a first embodiment of the present invention.

The rotation angle detection system 100 includes a resolver 10, an excitation circuit 20, a differential amplification device 30, an A/D converter 40, and the rotation angle detection device 50.

The resolver 10 includes a rotor 1, an excitation coil 11, a sine detection coil 12, and a cosine detection coil 13. The rotor is configured to rotate along with a motor (not shown). The excitation coil 11 is configured to be driven by an AC signal generated by the excitation circuit 20. The sine detection coil 12 is configured to detect the sine of a rotation angle of the motor. The cosine detection coil 13 is configured to detect the cosine of the rotation angle of the motor.

Figure 2:
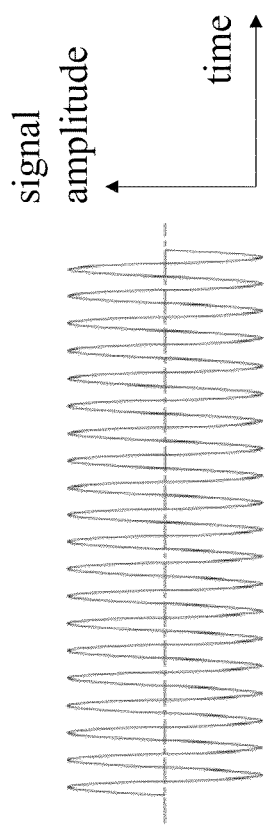
FIG. 2 is a graph for showing a temporal waveform of an AC signal generated by an excitation circuit of FIG. 1.
Figure 3:
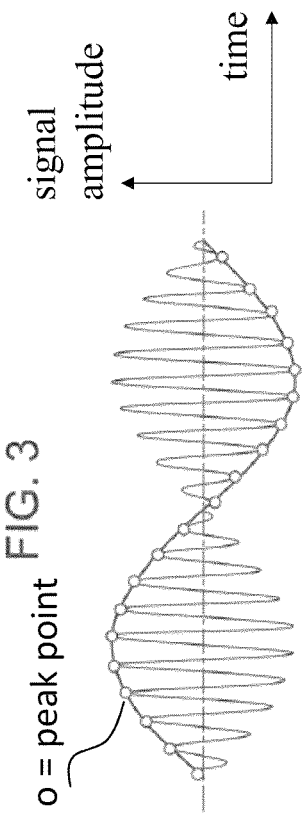
FIG. 3 is a graph for showing a temporal waveform of a signal appearing between output ends of a sine detection coil of FIG. 1.

When the excitation coil 11 is driven by the AC signal as shown in FIG. 2, a signal that is amplitude-modulated by the sine of the rotation angle of the motor is output between output ends of the sine detection coil 12 as shown in FIG. 3. Moreover, a signal amplitude-modulated by the cosine of the rotation angle of the motor is output at output ends of the cosine detection coil 13 as shown in FIG. 4.

Figure 4:
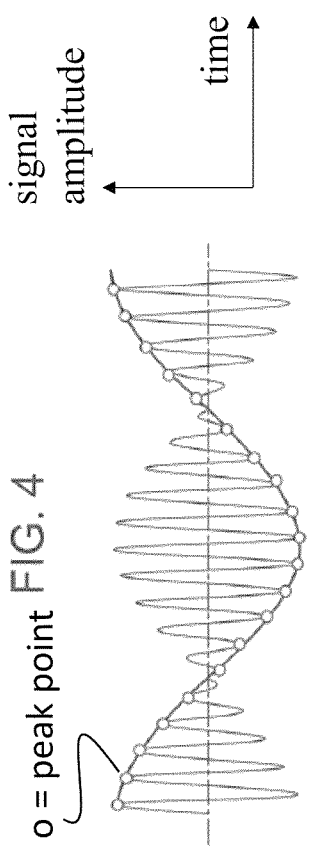
FIG. 4 is a graph for showing a temporal waveform of a signal appearing between output ends of a cosine detection co of FIG. 1.

Each of the horizontal axes of FIG. 2 to FIG. 4 represents a time axis, and one cycle of the rotation angle of the resolver 10 is shown. Moreover, each of the vertical axes of FIG. 2 to FIG. 4 represents the amplitude of each signal.

Referring back to FIG. 1, the signal between both of the output ends of the sine detection coil 12 is differentially amplified by a first differential amplifier 31 included in the differential amplification device 30, and is then input to the A/D converter 40. Similarly, the signal between both of the output ends of the cosine detection coil 13 is differentially amplified by a second differential amplifier 32 included in the differential amplification device 30, and is then input to the A/D converter 40.

In the A/D converter 40, each peak point of a sine value and a cosine value indicated by each circle of FIG. 3 and FIG. 4, respectively, that is, each peak point of the sine value and the cosine value detected by the differential amplifier 30, is A/D-converted. After that, a sine signal $S(\theta)$ and a cosine signal $C(\theta)$ indicated by the thick lines of FIG. 3 and FIG. 4 are obtained from signal sequences formed by connecting those peak points. Symbol $\theta$ represents the rotation angle of the motor.

When there exists a difference between the amplitude of the sine signal $S(\theta)$ and the amplitude of the cosine signal $C(\theta)$ output from the A/D converter 40, such correction that the difference therebetween approaches zero may be made.

Referring back to FIG. 1, each of the sine signal. $S(\theta)$ and the cosine signal $C(\theta)$ output from the A/D converter 40 is input to the rotation angle detection device 50.

The rotation angle detection device 50 includes an intermediate signal generation unit 51, a multiplication unit 52, an addition unit 53, and a rotation angle calculation unit 54. The intermediate signal generation unit 51 is configured to generate an intermediate signal TMP1 based on a product of the sine signal $S(\theta)$ and the cosine signal $C(\theta)$.

Figure 5:
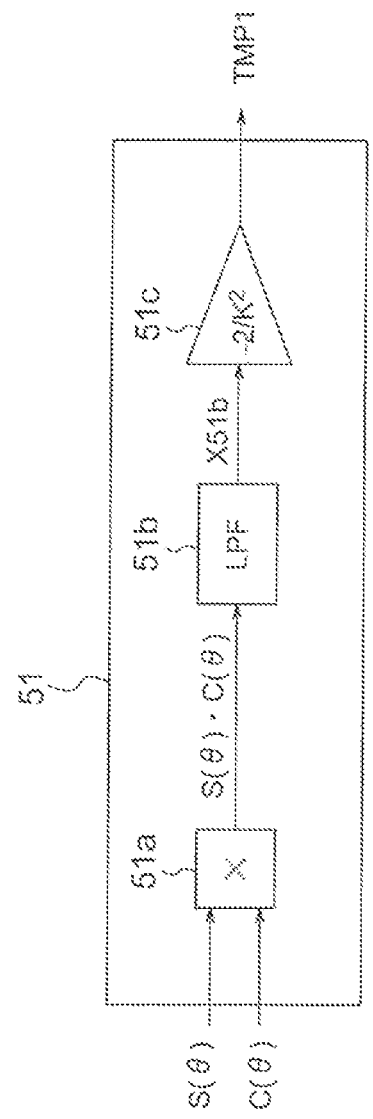
FIG. 5 is a block diagram for illustrating an internal configuration of an intermediate signal generation unit of FIG. 1.

As illustrated in FIG. 5, the intermediate signal generation unit 51 includes a multiplier 51a, a low-pass filer (LPF) 51b, and a multiplier 51c.

The multiplier 51a calculates the product $S(\theta) \cdot C(\theta)$ of the sine signal $S(\theta)$ and the cosine signal $C(\theta)$.

The cutoff frequency of the low-pass filter 51b is set to such a value as to remove frequency components equal to or higher than twice the frequency of the fundamental waves of the sine signal $S(\theta)$ and the cosine signal $C(\theta)$. Thus, an output X51b of the low-pass filter 51b is a signal obtained by removing the frequency components equal to or higher than twice the frequency of the fundamental waves of the sine signal $S(\theta)$ and the cosine signal $C(\theta)$ from the output $S(\theta) \cdot C(\theta)$ of the multiplier 51a.

The multiplier 51c multiplies the output X51b of the low-pass filter 51b by $-2/(K \times K) = -2/(K^2)$. Thus, the output of the multiplier 51c, that is, the output TMP1 of the intermediate signal generation unit 51, is $(-2/(K^2)) \cdot X51b$. Symbol K represents the amplitude of the sine signal $S(\theta)$ or the cosine signal $C(\theta)$.

As a method of obtaining K, an amplitude value measured offline in advance may be set to K. Alternatively, as described in Patent Literature 1, the amplitude value can also be calculated by reading, online, the value of the peak and the value of the valley of the sine signal $S(\theta)$ or the cosine signal $C(\theta)$.

Referring back to FIG. 1, the intermediate signal TMP1 generated by the intermediate signal generation unit 51 is input to the multiplication unit 52. The multiplication unit 52 multiplies the intermediate signal TMP1 by the sine signal $S(\theta)$. Thus, an output OUT1 of the multiplication unit 52 is TMP1·$(\theta)$.

The output OUT1 of the multiplication unit 52 is input to the addition unit 53. In the addition unit. 53, the cosine signal C(S) and OUT1 are added to each other. Thus, an output C_corr1($\theta$) of the addition unit 53 is C($\theta$)+OUT1.

The output C_corr1($\theta$)=C($\theta$)+OUT1 of the addition unit 53 is input to the rotation angle calculation unit 54. Moreover, the sine signal $S(\theta)$ is also input to the rotation angle calculation unit 54.

The rotation angle calculation unit 54 calculates the rotation angle signal $\theta r$ as given by the following expression based on the output C_corr1($\theta$)=C($\theta$)+OUT1 of the addition unit 53 and the sine signal $S(\theta)$.

$$\theta_r = \tan^{-1}\left(\frac{S(\theta)}{C\_corr1(\theta)}\right) = \tan^{-1}\left(\frac{S(\theta)}{C(\theta)+OUT1}\right) \qquad (1)$$

A detailed description is now given of a reason for a point that the orthogonality between the sine signal $S(\theta)$ and the cosine signal $C(\theta)$ is improved and thus the above-mentioned rotation angle errors or 2f are suppressed in the rotation angle detection device 50 described above.

First, it is assumed that the sine signal $S(\theta)$ and the cosine signal $C(\theta)$ are given as below, respectively.

$$S(\theta)=K \sin(\theta) \qquad (2)$$

$$C(\theta)K \cos(\theta+\alpha) \qquad (3)$$

That is, a phase difference between the sine signal $S(\theta)$ and the cosine signal $C(\theta)$ is $\pi/2+\alpha$ [rad]. Moreover, it is assumed that orthogonality between the sine signal $S(\theta)$ and the cosine signal $C(\theta)$ is reduced due to "$\alpha$" included in the cosine signal $C(\theta)$.

When the sine signal $S(\theta)$ and the cosine signal $C(\theta)$ are directly input to the rotation angle calculation unit 54, and it is assumed that OUT1 is 0, the rotation angle errors of 2f occur in the rotation angle signal $\theta r$ with respect to the actual rotation angle $\theta$ of the motor. It is an object of the first embodiment to suppress the rotation angle errors of 2f.

Expression (3) is expanded as given below.

$$C(\theta)=K \cos(\theta)\cos(\alpha)-K \sin(\theta)\sin(\alpha) \qquad (4)$$

When it is assumed that "$\alpha$" is sufficiently small, $\cos(\alpha)$ is approximated to 1. Thus, Expression (3) can be transformed as follows.

$$C(\theta)=K \cos(\theta)-K \sin(\theta)\sin(\alpha) \qquad (5)$$

When the second term on the right side can be removed from Expression (5), the orthogonality between the sine signal $S(\theta)$ and the cosine signal $C(\theta)$ is improved.

A purpose of the intermediate signal generation unit 51 and the multiplication unit 52 included in the rotation angle detection device 50 is to extract the second term on the right side of Expression (5). As described above, in the intermediate signal generation unit 51, the product $S(\theta) \cdot C(\theta)$ of the sine signal $S(\theta)$ and the cosine signal $C(\theta)$ is calculated by the multiplier 51a. The product $S(\theta) \cdot C(\theta)$ is expanded as given below.

$$S(\theta) \cdot C(\theta) = K\sin(\theta) \cdot K\cos(\theta + \alpha) \qquad (6)$$

$$= -\frac{1}{2}K^2\sin(\alpha) + \frac{1}{2}K^2\sin(2\theta)\sin(\alpha) + \frac{1}{2}K^2\cos(2\theta)\sin(\alpha)$$

In Expression (6), the first term on the right side is a DC term defined by "$\alpha$". Moreover, the second term and the third term on the right side include $\sin(2\theta)$ and $\cos(2\theta)$, respectively. The signals $\sin(2\theta)$ and $\cos(2\theta)$ oscillate at the frequency twice as high as the frequency of the fundamental waves of the sine signal $S(\theta)$ and the cosine signal ($\theta$).

When the signal given by Expression (6) is caused to pass through the low-pass filter 51b, the second term and the third term on the right side of Expression (6) are removed, and hence the output X51b thereof is given as below.

$$X51b = -\frac{1}{2}K^2\sin(\alpha) \qquad (2)$$

When the signal given by Expression (7) is caused to pass through the multiplier 51c, the output TMP1 thereof is given as below.

$$TMP1=\sin(\alpha) \qquad (8)$$

When the intermediate signal TMP1 given by Expression (8) is caused to pass through the multiplication unit 52 of the rotation angle detection device 50, the output OUT1 thereof is given as below.

$$OUT1=\sin(\alpha) \cdot K \sin(\theta) \qquad (9)$$

It is understood that $-1$ time Expression (9) matches the second term on the right side of Expression (5).

In the addition unit 53 of the rotation angle detection device 50, the following calculation is executed.

$$C_{corr1(\theta)}=C(\theta)+OUT1$$

$$=K \cos(\theta+\alpha)+\sin(\alpha)K \sin(\theta)$$

$$=K \cos(\theta) \qquad (10)$$

As described above, the sine signal $S(\theta)$ given by Expression (2) and the cosine signal $C(\theta)$ given by Expression (3)

are not orthogonal to each other, but the second term on the right side of Expression (5) is removed by the above-mentioned calculation. As a result, the sine signal S(θ) given by Expression (2) and a signal given by Expression (10), which is orthogonal to the sine signal S(θ), are input to the rotation angle calculation unit 54.

The following calculation is executed in the rotation angle calculation unit 54, and the rotation angle errors of 2f described above are consequently suppressed.

$$\theta_r = \tan^{-1}\left(\frac{S(\theta)}{C\_corr1(\theta)}\right) = \tan^{-1}\left(\frac{K\sin(\theta)}{K\cos(\theta)}\right) \quad (11)$$

The configuration of the rotation angle detection device 50 described above is such that the intermediate signal TMP1 is generated based on the product S(θ)·C(θ) of the sine signal S(θ) and the cosine signal C(θ), the intermediate signal TMP1 is multiplied by the sine signal S(θ), and the result OUT 1 of the multiplication and the cosine signal C(θ) are added to each other.

However, the configuration or the first embodiment is not limited to this example. For example, the sine signal S(θ) and the cosine signal C(θ) can also be given by as follows.

$$S(\theta) = K \sin(\theta + \alpha) \quad (12)$$

$$C(\theta) = K \cos(\theta) \quad (13)$$

In this case, the configuration of the rotation angle detection device 50 is such that the intermediate signal TMP1 is generated based on the product S(θ)·C(θ) of the sine signal S(θ) and the cosine signal C(θ), the intermediate signal TMP1 is multiplied by the cosine signal C(θ), and the result OUT1 of the multiplication is subtracted from the sine signal S(θ).

Moreover, the rotation angle detected by the rotation angle detection device 50 described above is the rotation angle of the motor, but an applicable range of the invention according to the first embodiment is not limited to the rotation angle of the motor. The invention according to the first embodiment can be applied to any rotating body, that is, rotating object.

In summary, the rotation angle detection device according to the first embodiment of the present invention includes: an intermediate signal generation unit configured to generate an intermediate signal based on a product of a sine signal and a cosine signal which are based on a rotation angle of a rotating body; a first multiplication unit configured to multiply the intermediate signal by one of the sine signal or the cosine signal; an addition/subtraction unit configured to add the other one of the sine signal or the cosine signal and an output of the first multiplication unit to each other or to subtract the output of the first multiplication unit from the other one of the sine signal or the cosine signal; and a first rotation angle calculation unit configured to calculate the rotation angle of the rotating body based on the one of the sine signal or the cosine signal and on an output of the addition/subtraction unit.

Further, the intermediate signal generation unit includes: a first multiplier configured to calculate the product of the sine signal and the cosine signal; and a first low-pass filter configured to remove frequency components equal to or higher than twice a frequency of fundamental waves of the sine signal and the cosine signal from an output of the first multiplier.

As a result, the orthogonality between the sine signal S(θ) and the cosine signal C(θ) is improved, and the rotation angle errors of 2f can thus be suppressed.

Second Embodiment

Description is now given of a rotation angle detection device according to a second embodiment of the present invention. In embodiments described below, components that are the same as or similar to those in the previous embodiments are denoted by the same reference numerals, and a detailed description thereof is omitted.

Figure 6:
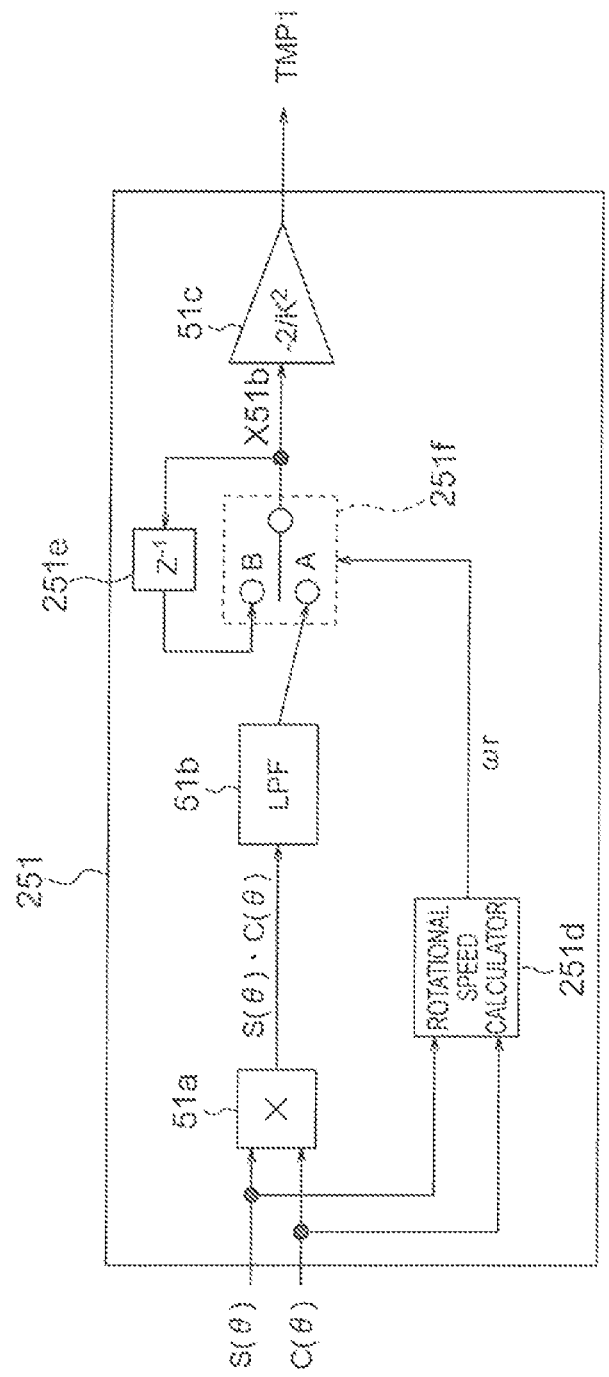
FIG. 6 is a block diagram for illustrating an internal configuration of an intermediate signal generation unit in a second embodiment of the present invention.

The rotation angle detection device according to the second embodiment includes an intermediate signal generation unit 251 of FIG. 6 in place of the intermediate signal generation unit 51 in the first embodiment.

The intermediate signal generation unit 251 includes the multiplier 51a, the low-pass filter 51b, and the multiplier 51c as in the first embodiment.

Moreover, the intermediate signal generation unit 251 includes a rotational speed calculator 251d, a delay device 251e, and a switch 251f.

The rotational speed calculator 251d calculates a rotational speed ωr of the motor based on the sine signal S(θ) and the cosine signal C(θ).

As a calculation method for the rotational speed ωr of the motor, the rotation angle signal θr is calculated based on the sine signal S(θ) and the cosine signal C(θ), and the rotational speed ωr of the motor is calculated by differentiating the rotation angle signal θr with respect to time. Alternatively, the rotational speed ωr of the motor can be calculated based on a period of time from zero-crossing of the sine signal S(θ) or the cosine signal C(θ) to next zero-crossing thereof.

The rotational speed ωr of the motor calculated by the rotational speed calculator 251d is input to the switch 251f as a signal for determination.

The switch 251f has two input terminals A and B. The output X51b of the low-pass filter 51b is input to the input terminal A. The signal output one cycle before by the switch 251f is again input to the input terminal B through the delay device 251e.

When the rotational speed ωr of the motor is equal to or higher than a predetermined rotational speed threshold value $\omega_{TH}$, the switch 251f outputs the signal on the input terminal A, that is, the output signal X51b of the low-pass filter 51b.

Moreover, when the rotational speed ωr of the motor is lower than the rotational speed threshold value $\omega_{TH}$, the switch 251f again outputs the signal on the input terminal B, that is, the signal output by the switch 251f itself one cycle before.

Thus, the switch 25f updates the output only when the rotational speed ωr of the motor is equal to or higher than the rotational speed threshold value $\omega_{TH}$, and holds the current output otherwise.

It is only required to determine the rotational speed threshold value $\omega_{TH}$ of the switch 251f in accordance with a rotational speed variation band of the motor. For example, when the rotational speed variation band of the motor is f [Hz], and h number of pole pairs of the motor is Pm, the rotational speed threshold value $\omega_{TH}$ can be determined as given by the following expression.

$$\omega_{TH} = f \times 60/P_m \text{ [r/min]} \quad (14)$$

Description is now given of effects of the rotation angle detection device according to the second embodiment. The above-mentioned intermediate signal generation unit 51 in the first embodiment calculates the product S(θ)·C(θ) of the sine signal S(θ) and the cosine signal C(θ) as given by Expression (6). In this configuration, when the rotational speed ωr of the motor is low, a variation frequency of the second term and the third term on the right side of Expression (6) is also low, and the second term and the third term may not sufficiently be removed by the low-pass filter 51*b*.

In order to handle this problem, the intermediate signal generation unit 251 in the second embodiment updates the intermediate signal TMP1 only when the rotational speed ωr of the motor is equal to or higher than the rotational speed threshold value $\omega_{TH}$, and holds the current intermediate signal otherwise. As a result, the orthogonality between the sine signal S(θ) and the cosine signal C(θ) is more precisely improved, and the rotation angle errors or 2f are thus more reliably suppressed.

As described above, according to the second embodiment of the present invention, the intermediate signal generation unit further includes: a first rotational speed calculator configured to calculate a rotational speed of the rotating body; and a first switch connected at a subsequent stage of the first low-pass filter, which is configured to update an output only when the rotational speed of the rotating body is equal to or higher than a predetermined rotational speed threshold value, and to hold a current output when the rotational speed of the rotating body is lower than the predetermined rotational speed threshold value. As a result, the orthogonality between the sine signal S(θ) and the cosine signal C(θ) is more precisely improved, and the rotation angle errors of 2f are thus more reliably suppressed.

Third Embodiment

Figure 7:
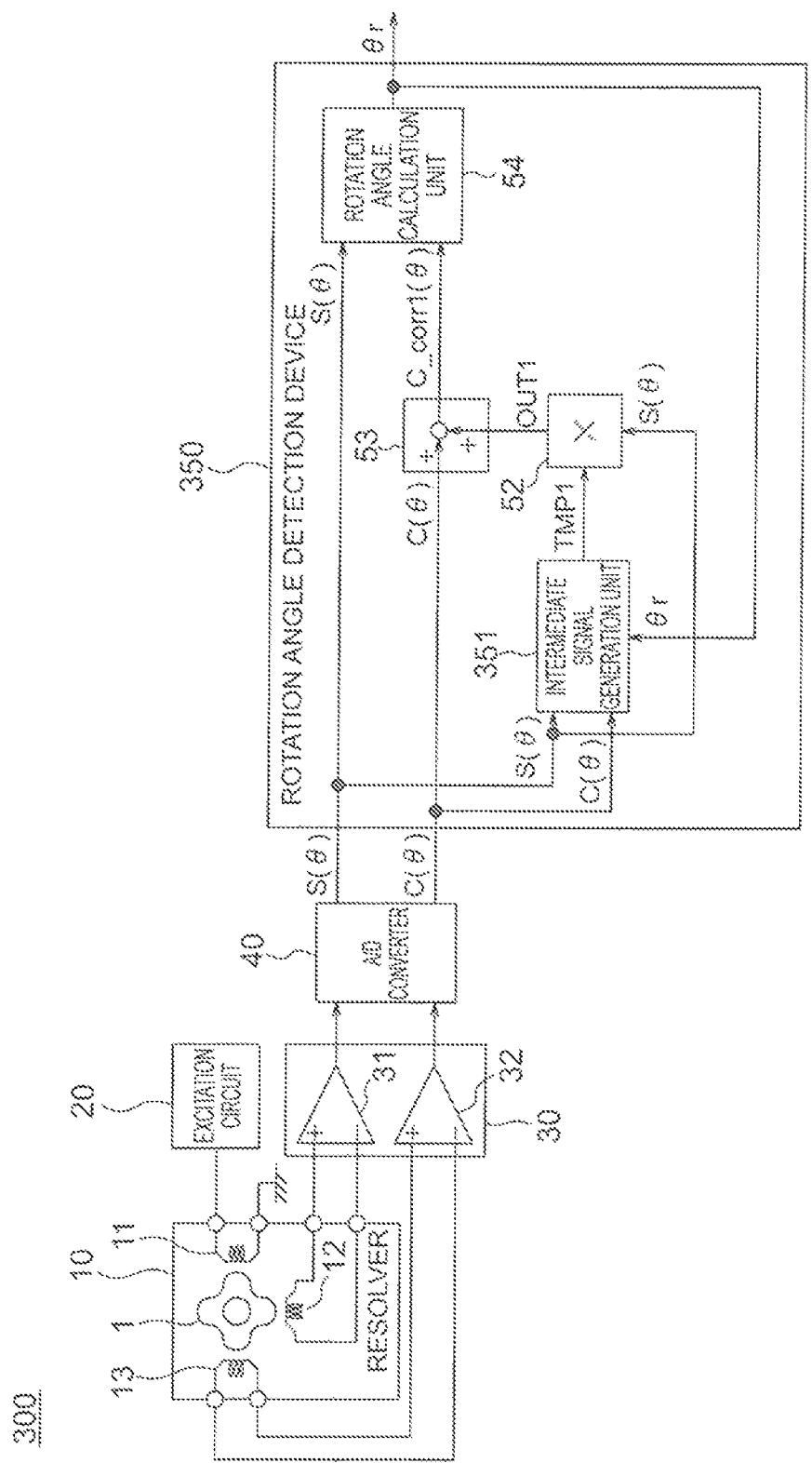
FIG. 7 is a block diagram for illustrating a configuration of a rotation angle detection system including a rotation angle detection device according to a third embodiment of the present invention.

FIG. 7 is a block diagram for illustrating a configuration of a rotation angle detection system 300 including a rotation angle detection device 350 according to a third embodiment of the present invention.

An intermediate signal generation unit 351 of the rotation angle detection device 350 according to the third embodiment calculates the intermediate signal TMP1 based on the sine signal S(θ) and the cosine signal C(θ) and on the rotation angle signal θr calculated by the rotation angle calculation unit 54.

Figure 8:
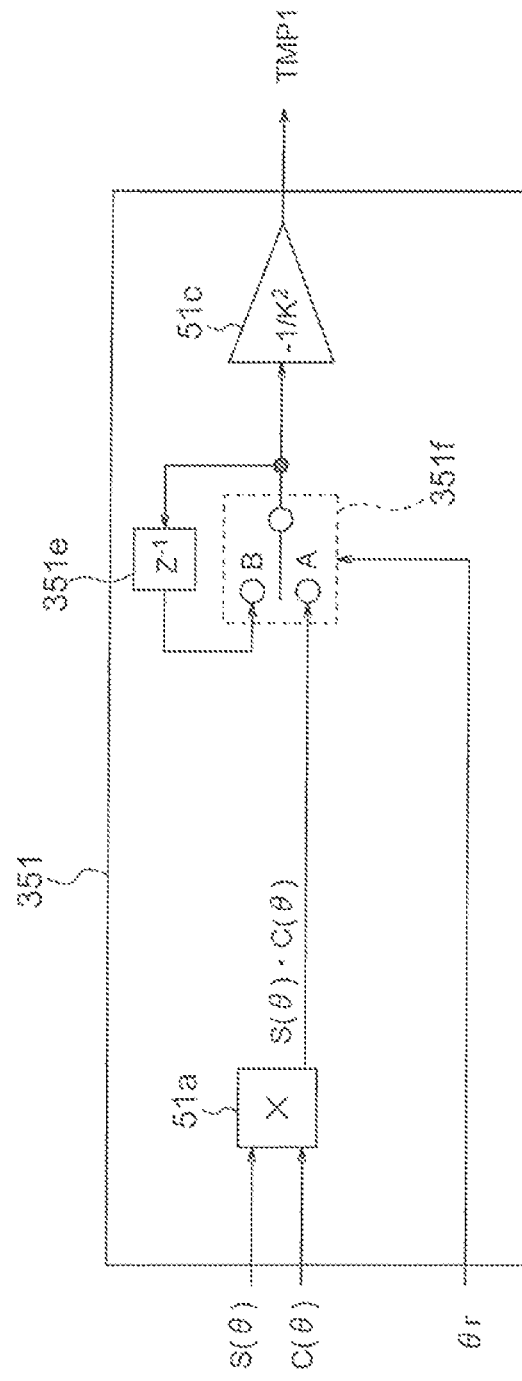
FIG. 8 is a block diagram for illustrating an internal configuration of an intermediate signal generation unit of FIG. 7.

As illustrated in FIG. 8, the intermediate signal generation unit 351 includes the multiplier 51*a*, a delay device 351*e*, a switch 351*f*, and the multiplier 51*c*.

That is, the intermediate signal generation unit 351 in the third embodiment does not include the low-pass filter included in each of the first and second embodiments.

The switch 351*f* has the two input terminals A and B. The output S(θ)·C(θ) of the multiplier 51*a* is input to the input terminal A. The signal output one cycle before by the switch 351*f* is again input to the input terminal B through the delay device 351*e*. Moreover, the rotation angle signal θr is input to the switch 351*f* as the signal for determination.

When the rotation angle signal θr is 90 degrees or 270 degrees, the switch 351*f* outputs the signal on the input terminal A, that is, the output signal S(θ)·C(θ) of the multiplier 51*a*.

Moreover, when the rotation angle signal θr is not 90 degrees or 270 degrees, the switch 351*f* again outputs the signal on the input terminal B, that is, the signal output by the switch 351*f* itself one cycle before.

Thus, the switch 351*f* updates the out put only when the rotation angle signal θr is 90 degrees or 270 degrees, and holds the current output otherwise.

When the rotation angle signal θr is 90 degrees or 270 degrees, the output of the switch 351*f* is given as below, respectively.

$$S\left(\frac{\pi}{2}\right) \cdot C\left(\frac{\pi}{2}\right) = K\sin\left(\frac{\pi}{2}\right) \cdot K\cos\left(\frac{\pi}{2} + \alpha\right) = -K^2\sin(\alpha) \quad (15)$$

$$S\left(\frac{3}{2}\pi\right) \cdot C\left(\frac{3}{2}\pi\right) = K\sin\left(\frac{3}{2}\pi\right) \cdot K\cos\left(\frac{3}{2}\pi + \alpha\right) = -K^2\sin(\alpha) \quad (16)$$

Thus, the output TMP1 of the multiplier 51*c*, that is, the output TMP1 of the intermediate signal generation unit 351 is always sin(α) as given below, and thus matches Expression (8).

$$TMP1 = -K^2 \sin(\alpha) \cdot (-1/K^2) = \sin(\alpha) \quad (17)$$

Thus, the intermediate signal generation unit 351 in the third embodiment can generate the intermediate signal TMP1=sin(α) while the intermediate signal generation unit 351 does not include the low-pass filter included in each of the first and second embodiments.

Meanwhile, for example, when the rotation angle signal θr is apart from 90 degrees by δ [rad], the output of the switch 351*f* is given as below.

$$\begin{aligned} S\left(\frac{\pi}{2}+\delta\right) \cdot C\left(\frac{\pi}{2}-\delta\right) &= K\sin\left(\frac{\pi}{2}+\delta\right) \cdot K\cos\left(\frac{\pi}{2}+\delta+\alpha\right) \\ &= -K^2\cos(\delta) \cdot \sin(\delta+\alpha) \\ &= -\frac{K^2}{2}(\sin(2\delta)\cos(\alpha) + (1+\cos(2\alpha)) \cdot \sin(\alpha)) \end{aligned} \quad (18)$$

Thus, when sin (2δ) of the first term on the right side is large, the output of the switch 351*f* greatly deviates from Expression (15). To deal with this problem, as described above, the switch 351*f* holds the current output when the rotation angle signal θr is not 90 degrees or 270 degrees.

As described above, according to the third embodiment of the present invention, the intermediate signal generation unit further includes: a first multiplier configured to calculate the product of the sine signal and the cosine signal; and a second switch connected at a subsequent stage of the first multiplier, which is configured to update an output only when the rotation angle of the rotating body calculated by the first rotation angle calculation unit is 90 degrees or 270 degrees, and to hold a current output when the rotation angle of the rotating body calculated by the first rotation angle calculation unit is not 90 degrees or 270 degrees.

As a result, the intermediate signal TMP1 can be generated while the low-pass filter is not included as in the first and second embodiments, and a component cost and an amount of calculation can thus be reduced compared to the first and second embodiments. Moreover, the orthogonality between the sine signal S(θ) and the cosine signal C(θ) is highly precisely improved without depending on the rotational speed ωr of the motor as in the second embodiment. Accordingly, the rotation angle errors of 2f can more reliably be suppressed.

When δ is at such a level that a relationship given by Expression (19) is satisfied in Expression (18), influence on precision for identifying sin(α) is low. For example, Kδ is only required to be approximately ⅕. Thus, even when the rotation angle signal θr does not strictly match 90 degrees or 270 degrees, the rotation angle signal θr is only required to be in a vicinity of 90 degrees or in a vicinity of 270 degrees.

$$\left|\frac{\sin(2\delta)}{(1+\cos(2\delta))}\right| < K_\delta \sin(\alpha) \tag{19}$$

Fourth Embodiment

Description is now given of a rotation angle detection device 450 according to a fourth embodiment of the present invention.

The above-mentioned rotation angle detection devices according to the first to third embodiments have an object to improve the orthogonality between the sine signal S(θ) and the cosine signal C(θ) when the orthogonality between the sine signal S(θ) and the cosine signal C(θ) is low, to thereby suppress the rotation angle errors of 2f.

Meanwhile, the rotation angle detection device 450 according to the fourth embodiment has an object to improve an amplitude ratio between the amplitude of the sine signal S(θ) and the amplitude of the cosine signal C(θ) when the amplitude of the sine signal S(θ) and the amplitude of the cosine signal C(θ) are different from each other, to thereby suppress the rotation angle errors of 2f.

Figure 9:
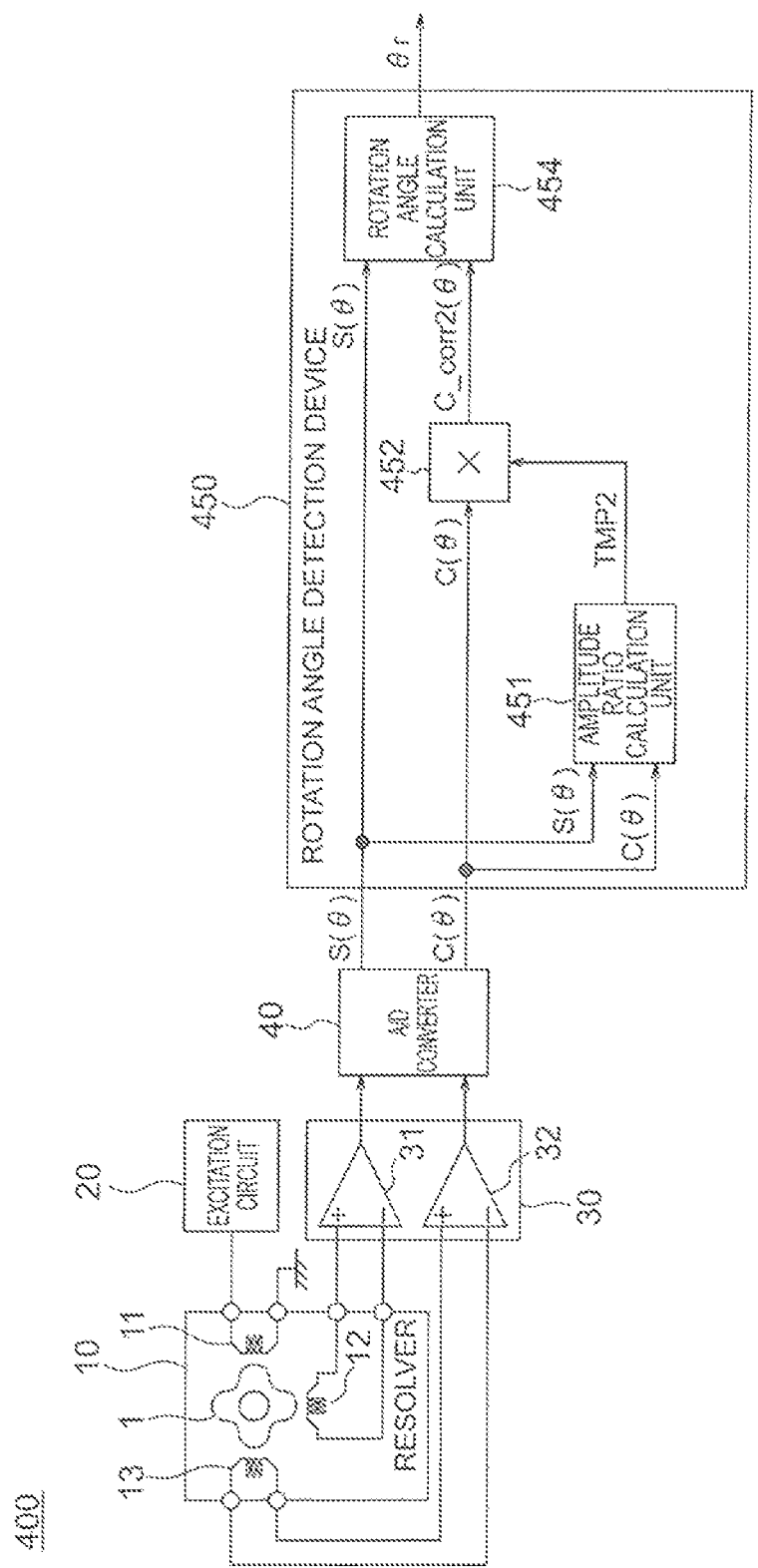
FIG. 9 is a block diagram for illustrating a configuration of a rotation angle detection system including a rotation angle detection device according to a fourth embodiment of the present invention.

FIG. 9 is a block diagram for illustrating a configuration of a rotation angle detection system 400 including the rotation angle detection device 450 according to a fourth embodiment of the present invention.

The rotation angle detection device 450 according to the fourth embodiment includes an amplitude ratio calculation unit 451, a multiplication unit 452, and a rotation angle calculation unit 454. The amplitude ratio calculation unit 451 generates an amplitude ratio signal TMP2 corresponding to the amplitude ratio between the sine signal and the cosine signal based on the respective second powers of the sine signal S(θ) and the cosine signal C(θ).

Figure 10:
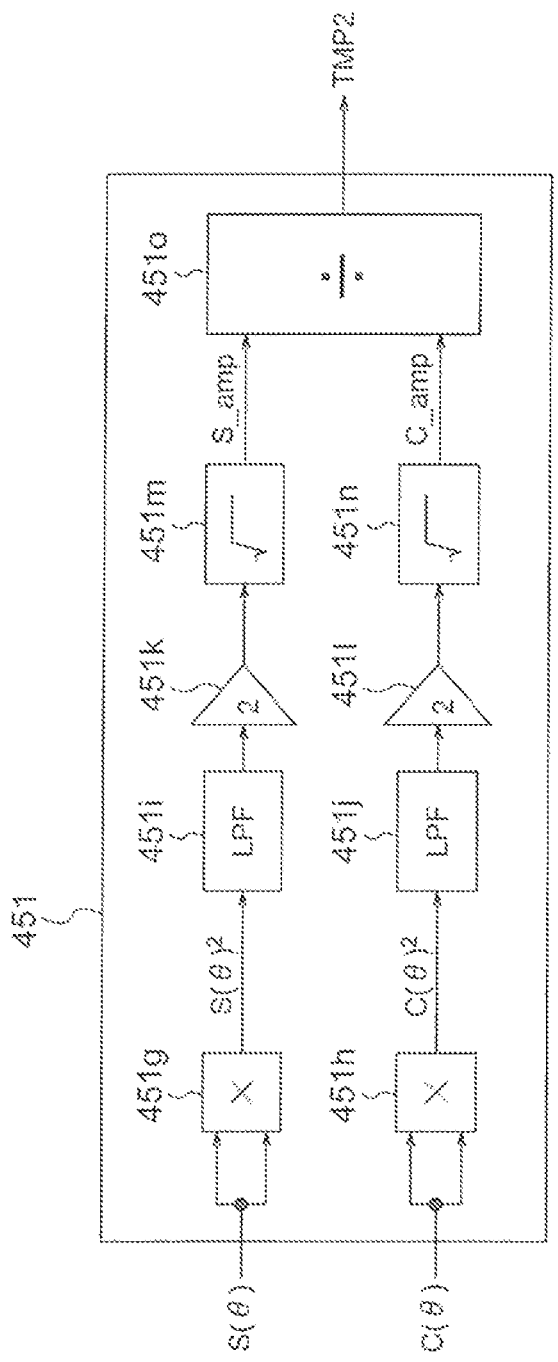
FIG. 10 is a block diagram for illustrating an internal configuration of an amplitude ratio calculation unit of FIG. 9.

As illustrated in FIG. 10, the amplitude ratio calculation unit 451 includes multipliers 451g and 451h, low-pass filers 451i and 451j, multipliers 451k and 451l, square root calculators 451m and 451n, and a divider 451o.

The multiplier 451g calculates the second power of the sine signal S(θ). Similarly, the multiplier 451-h calculates the second power of the cosine signal C(θ).

The cutoff frequency of the low-pass filter 451i is set to such a value as to remove frequency components equal to or higher than twice the frequency of the fundamental wave of the sine signal S(θ). Thus, an output of the low-pass filter 451i is a signal obtained by removing the frequency components equal to or higher than twice the frequency of the fundamental waves from the output S(θ)² of the multiplier 451g.

Similarly, the cutoff frequency of the low-pass filter 451j is set to such a value as to remove frequency components equal to or higher than twice the frequency of the fundamental wave of the cosine signal C(θ). Thus, an output of the low-pass filter 451i is a signal obtained by removing the frequency components equal to or higher than twice the frequency of the fundamental wave from the output C(θ)² of the multiplier 451h.

The multiplier 451k multiplies an output of the low-pass filter 451i by two. Similarly, the multiplier 451l multiplies an output of the low-pass filter 451j by two.

The square root calculator 451m calculates a square root S_amp of an output of the multiplier 451k. Similarly, the square root calculator 451n calculates a square root C_amp of an output of the multiplier 451l.

The divider 451o calculates the amplitude ratio signal TMP2 as given by the following expression.

$$TMP2 = \frac{S\_amp(\theta)}{C\_amp(\theta)} \tag{20}$$

A detailed description is now given of a reason for point that the amplitude ratio between the sine signal S(θ) and the cosine signal C(θ) is improved and thus the rotation angle errors of 2f are suppressed in the rotation angle detection device 450 described above.

First, it is assumed that the sine signal S(θ) and the cosine signal C(θ) are given as below, respectively. It is assumed that $K_1 \approx K_2$.

$$S(\theta) = K_1 \sin(\theta) \tag{21}$$

$$C(\theta) = K_2 \cos(\theta) \tag{22}$$

As described above, when Expression (21) and Expression (22) are directly input to the rotation angle calculation unit 454, the rotation angle errors of 2f occur in the rotation angle signal $\theta_r$ with respect to the actual rotation angle θ of the motor. It is an object of the fourth embodiment to suppress the rotation angle errors of 2f.

First, S(θ)² and C(θ)² are calculated by the multipliers 451g and 451h, respectively.

$$S(\theta)^2 = K_1 \sin^2(\theta) = \frac{1}{2}K_1^2(1 - \cos(2\theta)) \tag{23}$$

$$C(\theta)^2 = K_2 \cos^2(\theta) = \frac{1}{2}K_2^2(1 + \cos(2\theta)) \tag{24}$$

After that, components of cos(2θ) included in Expression (23) and Expression (24) are removed by the low-pass filters 451i and 451j, respectively.

$$\frac{1}{2}K_1^2 \tag{25}$$

$$\frac{1}{2}K_2^2 \tag{26}$$

After that, S_amp and C_amp are given as below through the calculation by the multipliers 451k and 451l and the square root calculators 451m and 451n, respectively.

$$S\_amp = K_1 \tag{27}$$

$$C\_amp = K_2 \tag{28}$$

Thus, the output of the divider 451o, that is, the amplitude ratio signal TMP2 output by the amplitude ratio calculation unit 451 is given as below.

The amplitude ratio calculation unit 451 described above is configured to calculate S_amp and C_amp and then execute the division, but the configuration of the amplitude ratio calculation unit 451 is not limited to this example. For example, the order of processing may be changed such that the output results of the low-pass filters 451*i* and 451*j* are caused to pass through the divider 451*o*, and after that, the output of the divider 451*o* is caused to pass through the multiplier 451*k* and the square root calculator 451*m*.

$$TMP2 = \frac{\text{S\_amp}}{\text{C\_amp}} = \frac{K_1}{K_2} \tag{29}$$

Referring back to FIG. 9, when the amplitude ratio signal TMP2 output by the amplitude ratio calculation unit 451 is caused to pass through the multiplication unit 452 of the rotation angle detection device 450, the output C_corr2(θ) of the multiplication unit 452 is given as below.

$$\text{C\_corr2}(\theta) = TMP2 \cdot \cos(\theta) = \frac{K_1}{K_2} \cdot K_2 \cos(\theta) = K_1 \cos(\theta) \tag{30}$$

Thus, the following calculation is executed in the rotation angle calculation unit 454, and the rotation angle errors of 2f are consequently suppressed.

$$= \tan^{-1}\left(\frac{S(\theta)}{\text{C\_corr2}(\theta)}\right) = \tan^{-1}\left(\frac{K_1 \sin(\theta)}{K_1 \cos(\theta)}\right)$$

Description is now given of an advantage of the method in the fourth embodiment over a method of reading a value of the peak and a value of the valley of each of the sine signal S(θ) and the cosine signal C(θ), which is described in Patent Literature 1.

First, an ideal sine signal S(θ) and cosine signal C(θ) include only the fundamental waves having the same cycle as the rotation angle θ of the motor as given by Expression (21) and Expression (22), respectively. However, the actual sine signal S(θ) and cosine signal C(θ) include components of harmonics in addition to the fundamental waves.

A consideration is now given of a case in which the sine signal S(θ) includes a frequency component three times as high as the fundamental wave, that is, a third harmonic component.

$$S(\theta) = K_1 \sin(\theta) + \frac{1}{6} K_1 \sin(3\theta) \tag{32}$$

Figure 11:
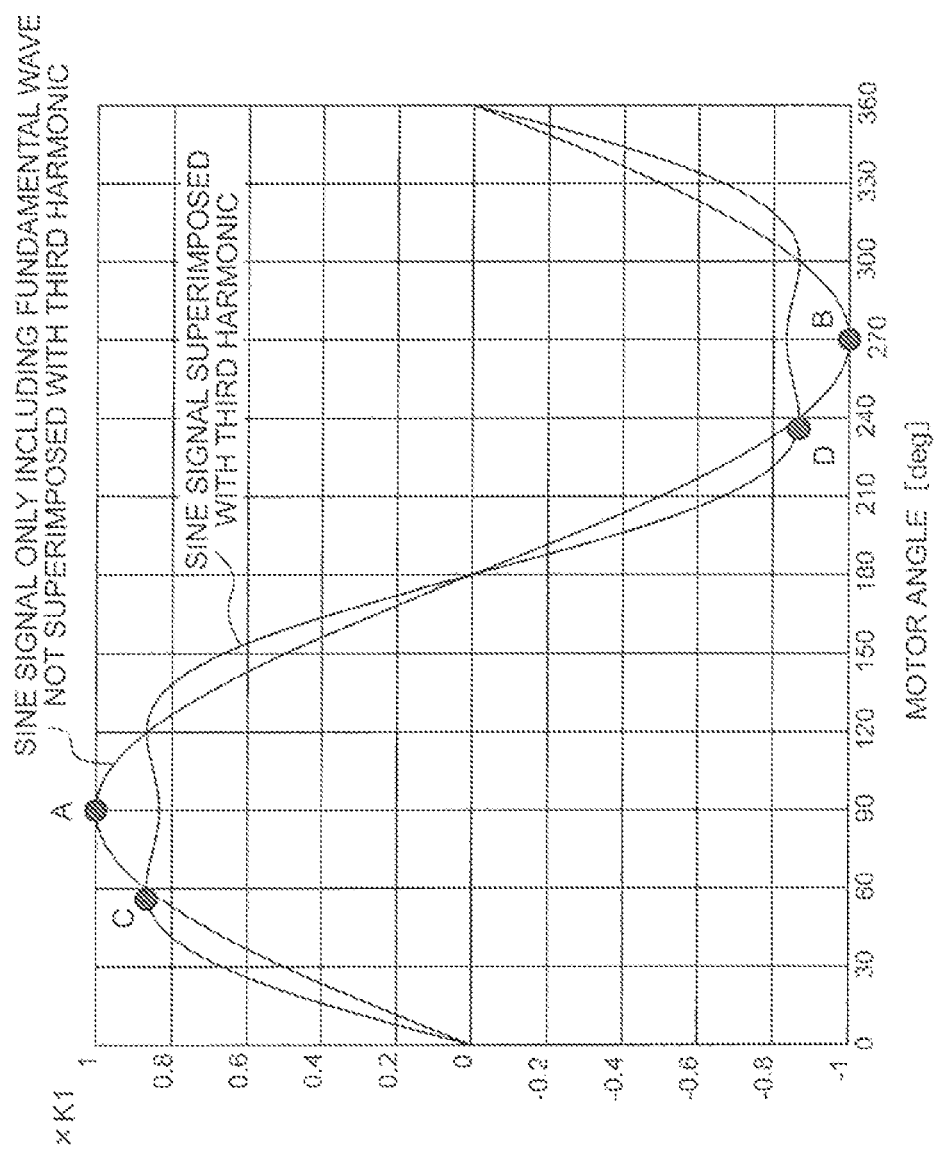
FIG. 11 is a graph for showing a comparison between a sine signal only including a fundamental wave and a sine signal including a third harmonic superimposed on the fundamental wave.

In this case, as shown in FIG. 11, the sine signal. S(θ) is a signal formed by superimposing the third harmonic on the fundamental wave.

A rotation angle corresponding to the value of the peak of the sine signal S(θ) including only the fundamental wave, that is, a rotation angle θ corresponding to a point A of FIG. 11 is 90 degrees as given by the first term on the right side of Expression (31). Moreover, a rotation angle θ corresponding to the value of the valley of the sine signal S(θ) including only the fundamental wave, that is, a rotation angle corresponding to a point B of FIG. 11 is 270 degrees similarly as given by the first term on the right side of Expression (31).

Meanwhile, a rotation angle corresponding to a value of the peak of a sine signal S(θ) being the fundamental wave superimposed with the third harmonic, that is, a rotation angle θ corresponding to a point C of FIG. 11 is apart from 90 degrees. Similarly, a rotation angle corresponding to a value of the valley of a sine signal S(θ) being the funda-mental wave superimposed with the third harmonic, that is, a rotation angle θ corresponding to a point D of FIG. 11 is apart from 270 degrees.

Thus, the method of Patent Literature 1 cannot accurately extract the amplitude of each of the sine signal S(θ) and the cosine signal C(θ) when harmonic components other than the fundamental waves are included in the sine signal S(θ) or the cosine signal C(θ).

In contrast, the method of the fourth embodiment can cause the second power of the sine signal S(θ) and the second power of the cosine signal C(θ) to pass through the low-pass filters 451*i* and 451*j*, respectively, in the amplitude ratio calculation unit 451, to thereby be able to remove the influence of the harmonic components. As a result, each of the amplitudes of the sine signal S(θ) and the cosine signal C(θ) can accurately be extracted.

The rotation angle detection device 450 is configured to generate the amplitude ratio signal TMP2 based on the respective second powers of the sine signal S(θ) and the cosine signal C(θ), multiply the amplitude ratio signal TMP2 by the cosine signal C(θ), and to calculate the rotation angle signal θr based on the multiplication result C_corr2(θ) and the sine signal S(θ).

However, the configuration of the fourth embodiment is not limited to this example. The rotation angle detection device 450 may be configured to generate the amplitude ratio signal TMP2 based on the respective second powers of the sine signal S(θ) and the cosine signal C(θ), multiply the amplitude ratio signal TMP2 by the sine signal S(θ), and to calculate the rotation angle signal θr based on a multiplication result S_corr2 (θ) and the cosine signal C(θ).

In summary, the rotation angle detection device according to the fourth embodiment of the present invention includes: an amplitude ratio calculation unit configured to calculate an amplitude ratio between a sine signal and a cosine signal which are based on a rotation angle of a rotating body, based on the respective second powers of the sine signal and the cosine signal; a second multiplication unit configured to multiply the amplitude ratio by one of the sine signal or the cosine signal; and a second rotation angle calculation unit configured to calculate the rotation angle of the rotating body based on an output of the second multiplication unit and the other one of the sine signal or the cosine signal.

Further, the amplitude ratio calculation unit includes: a second multiplier configured to calculate the second power of the sine signal; a third multiplier configured to calculate the second power of the cosine signal; a second low-pass filter configured to remove frequency components equal to or higher than twice a frequency of a fundamental wave of the sine signal from an output of the second multiplier; and a third low-pass filter configured to remove frequency components equal to or higher than twice a frequency of a fundamental wave of the cosine signal from an output of the third multiplier.

As a result, the amplitude ratio between the sine signal S(θ) and the cosine signal C(θ) is improved, and the rotation angle errors of 2f can thus be suppressed.

The amplitude ratio calculation unit 451 of FIG. 10 calculates the amplitude ratio based on the results of the passage of the outputs of the low-pass filters 451*i* and 451*j* through the multipliers 451*k* and 451*l*, respectively. However, the value of "2" multiplied by the multipliers 451*k* and 451*l* are canceled out by the divider 451*o* at the subsequent stage. Thus, the multipliers 451*k* and 451*l* may be omitted.

Moreover, the amplitude ratio calculation unit. 451 of FIG. 10 is configured to execute the square root calculation by the square root calculators 451*m* and 451*n*, and after that, to execute the division by the divider 451o, but may be configured to execute the division, and after that, to execute the square root calculation.

Fifth Embodiment

Description is now given of a rotation angle detection device according to a fifth embodiment of the present invention.

Figure 12:
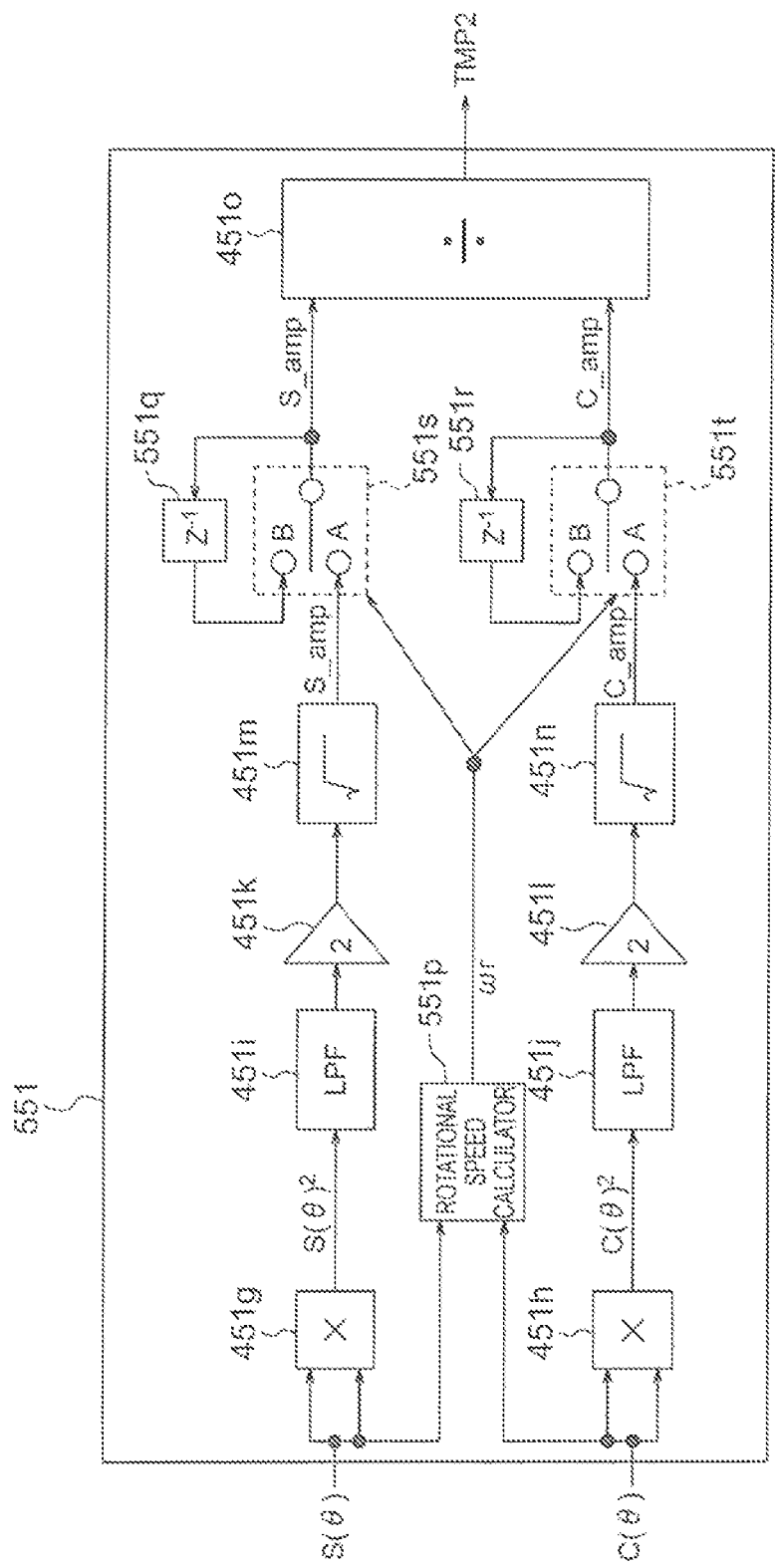
FIG. 12 is a block diagram for illustrating an internal configuration of an amplitude ratio calculation unit in a fifth embodiment of the present invention.

The rotation angle detection device according to the fifth embodiment includes an amplitude ratio calculation unit 551 of FIG. 12 in place of the amplitude ratio calculation unit 451 in the fourth embodiment.

The amplitude ratio calculation unit 551 includes the multipliers 451g and 451h, the low-pass filers 451i and 451j, the multipliers 451k and 451l, the square root calculators 451m and 451n, and the divider 451o as in the fourth embodiment.

Moreover, the amplitude ratio calculation unit 551 includes a rotational speed calculator 551p, delay devices 551q and 551r, and switches 551s and 551t.

The rotational speed calculator 551p calculates the rotational speed ωr of the motor based on the sine signal S(θ) and the cosine signal C(θ). As a calculation method for the rotational speed ωr of the motor, the same method described in the second embodiment may be used.

The rotational speed ωr of the motor calculated by the rotational speed calculator 551p is input to the switches 551s and 551t as a signal for determination.

The switch 551s has two input terminals A and B. The output S_amp of the square root calculator 451m is input to the input terminal A. The signal output one cycle before by the switch 551s is again input to the input terminal B through the delay device 551q.

Similarly, the switch 551t has two input terminals A and B. The output C_amp of the square root calculator 451n is input to the input terminal A. The signal output one cycle before by the switch 551t is again input to the input terminal B through the delay device 551r.

When the rotational speed ωr of the motor is equal to or higher than the predetermined rotational speed threshold value $\omega_{TH}$, the switches 551s and 551t output the signals on the input terminals A, that is, the output signals S_amp and C_amp of the square root calculators 451m and 451n, respectively.

Moreover, when the rotational speed ωr of the motor is lower than the rotational speed threshold value $\omega_{TH}$, the switches 551s and 551t again output the signals on the input terminals B, that is, the signals output by the switches 551s and 551t one cycle before.

Thus, the switches 551s and 551t update the output only when the rotational speed ωr of the motor is equal to or higher than the rotational speed threshold value $\omega_{TH}$, and hold the current output otherwise.

It is only required to determine the rotational speed threshold value $\omega_{TH}$ of the switches 551s and 551t in accordance with a rotational speed variation band of the motor. For example, when the rotational speed variation band of the motor is f [Hz], and the number of pole pairs of the motor is Pm, the rotational speed threshold value $\omega_{TH}$ can be determined as given by the following expression.

$$\omega_{TH} = 2 \times f \times 60 / P_m \text{ [r/min]} \quad (33)$$

The rotational speed threshold value $\omega_{TH}$ of Expression (33) is the number of rotations corresponding to the frequency of the second harmonics of the sine signal S(θ) and the cosine signal C(θ).

Thus, the amplitude ratio calculation unit 551 updates the amplitude ratio signal TMP2=(S_amp/C_amp) only when the rotational speed ωr of the motor is equal to or higher than the rotational speed threshold value $\omega_{TH}$, and holds the current amplitude ratio otherwise.

Description is now given of effects of the rotation angle detection device according to the fifth embodiment. As described in the fourth embodiment, the outputs of the multipliers 451g and 451h are given by Expression (23) and Expression (24) respectively. In this configuration, when the rotational speed ωr of the motor is low, a variation frequency of the second term on the right side of each of Expression (23) and Expression (24) is also low, and thus the second terms may not sufficiently be removed by the low-pass filters 451i and 451j.

In order to handle this problem, the amplitude ratio calculation unit 551 in the fifth embodiment updates the amplitude ratio signal TMP2 only when the rotational speed ωr of the motor is equal to or higher than the rotational speed threshold value $\omega_{TH}$, and holds the amplitude ratio signal otherwise. As a result, the amplitude ratio between the sine signal S(θ) and the cosine signal C(θ) is more precisely improved, and the rotation angle errors or 2f are thus more reliably suppressed.

As described above, according to the fifth embodiment of the present invention, the amplitude ratio calculation unit further includes: a second rotational speed calculator configured to calculate a rotational speed of the rotating body; a third switch connected at a subsequent stage of the second low-pass filter, which is configured to update an output only when the rotational speed of the rotating body is equal to or higher than a predetermined rotational speed threshold value, and to hold a current output when the rotational speed of the rotating body is lower than the predetermined rotational speed threshold value; and a fourth switch connected at a subsequent stage of the third low-pass filter, which is configured to update an output only when the rotational speed of the rotating body is equal to or higher than a predetermined rotational speed threshold value, and to hold a current output when the rotational speed of the rotating body is lower than the predetermined rotational speed threshold value. The third switch is arranged at the subsequent stage of the third low-pass filter, and the fourth switch is arranged at the subsequent stage of the fourth low-pass filter, but the third switch and the fourth switch may be arranged at other positions. For example, a configuration in which one switch is provided on the subsequent stage of the divider 451o can also provide the same effects.

As a result, the amplitude ratio between the sine signal S(θ) and the cosine signal C(θ) is more precisely improved, and the rotation angle errors of 2f are thus more reliably suppressed.

Sixth Embodiment

Figure 13:
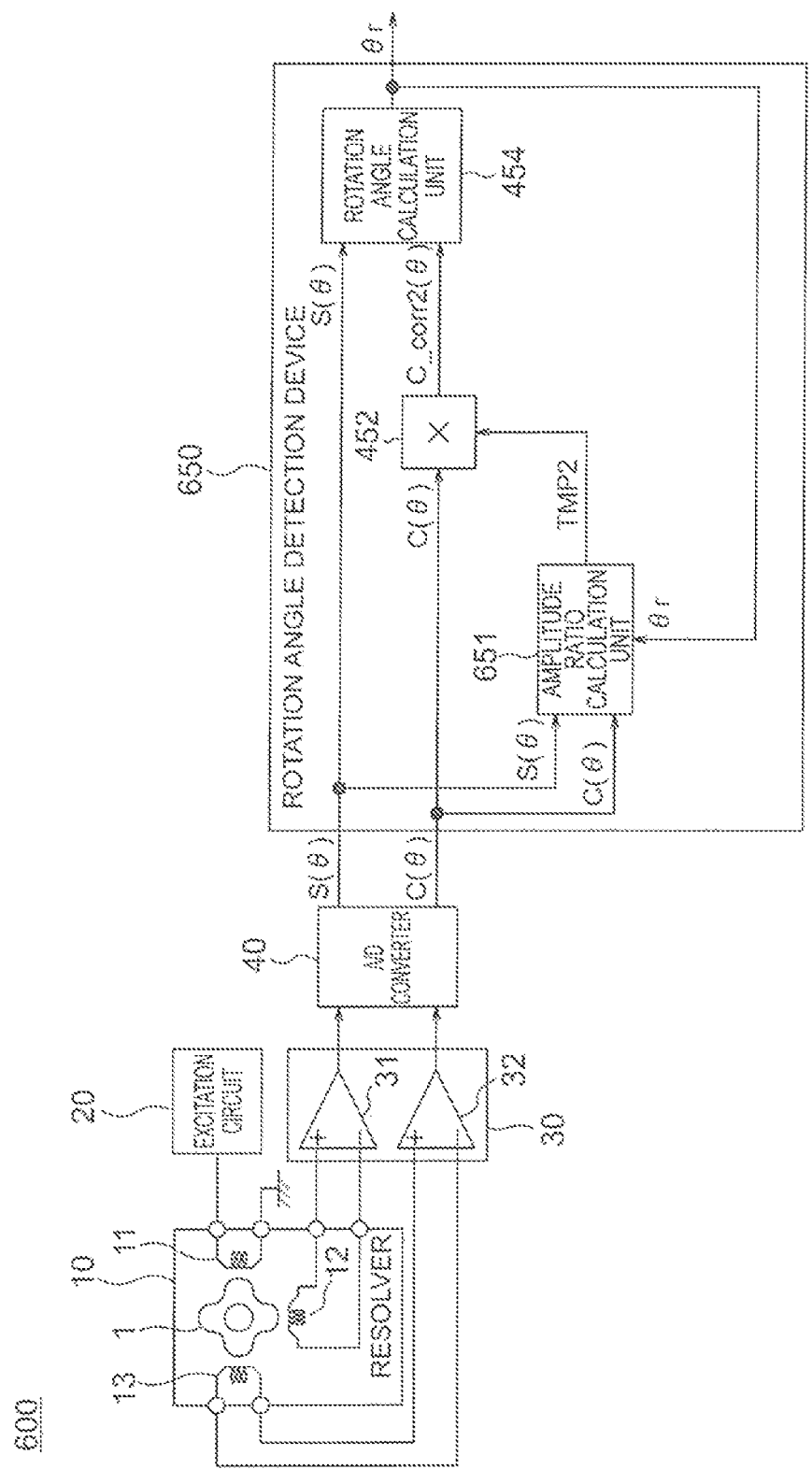
FIG. 13 is a block diagram for illustrating a configuration of a rotation angle detection system including a rotation angle detection device according to a sixth embodiment of the present invention.

FIG. 13 is a block diagram for illustrating a configuration of a rotation angle detection system 600 including a rotation angle detection device 650 according to a sixth embodiment of the present invention.

The rotation angle detection device 650 according to the sixth embodiment calculates the amplitude ratio signal TMP2 based on the sine S(θ) and the cosine signal C(θ) and on the rotation angle signal θr calculated by the rotation angle calculation unit 454.

Figure 14:
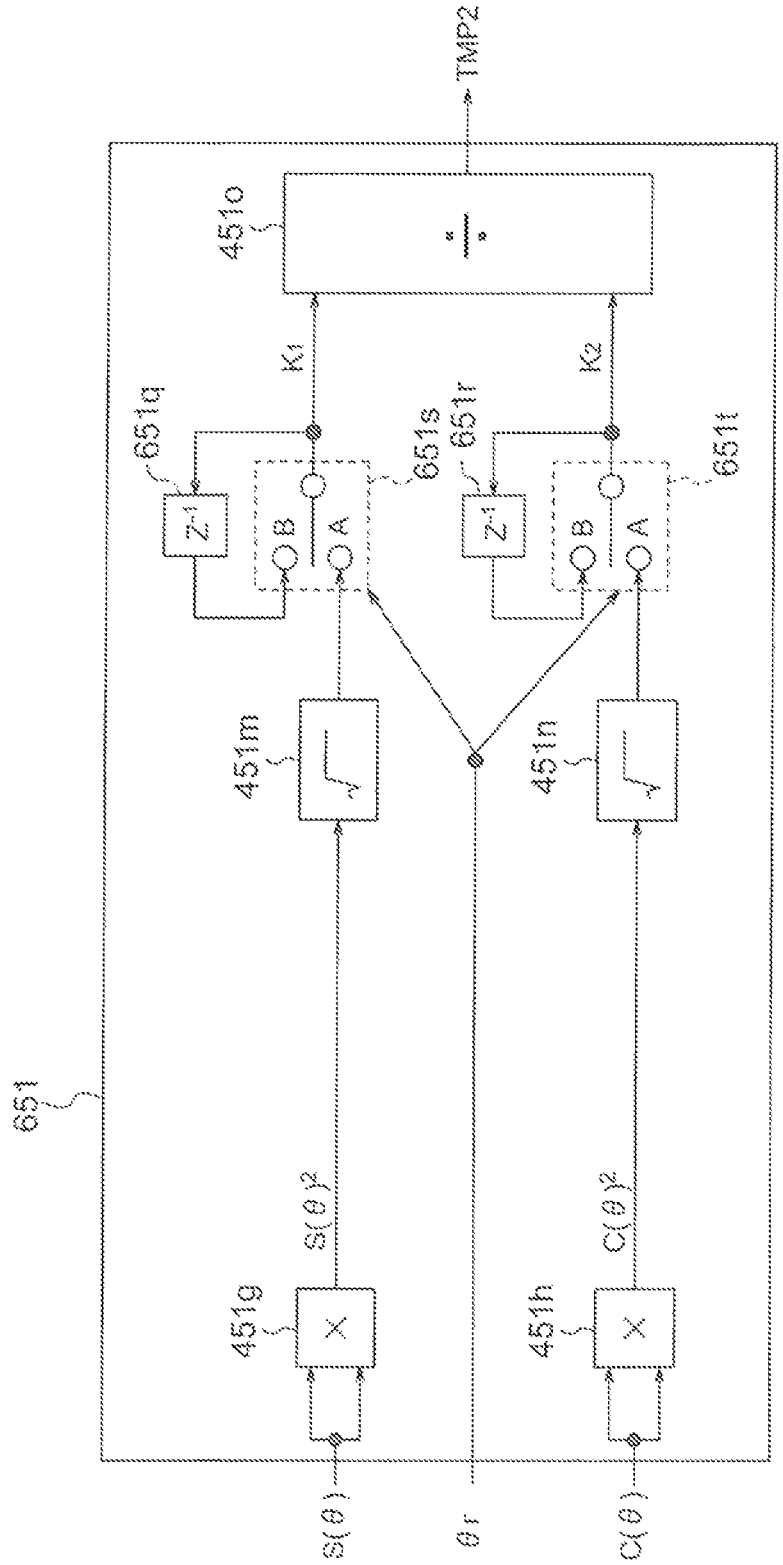
FIG. 14 is a block diagram for illustrating an internal configuration of an amplitude ratio calculation unit of FIG. 13.

As illustrated in FIG. 14, an amplitude ratio calculation unit 651 includes the multipliers 451g and 451h, the square root calculators 451m and 451n, delay devices 651q and 651r, and switches 651s and 651t.

That is, the amplitude ratio calculation unit 651 in the sixth embodiment does not include the low-pass filters included in the fourth and fifth embodiments.

The switch 651s has the two input terminals A and B. The output of the square root calculator 451m is input to the input terminal A. The signal output one cycle before by the switch 651s is again input to the input terminal 3 through the delay device 651q. Moreover, the rotation angle signal θr is input to the switch 651s as the signal for determination.

When the rotation angle signal θr is 90 degrees or 270 degrees, the switch 651s outputs the signal on the input terminal A, that is, the output signal of the square root calculator 451m.

Moreover, when the rotation angle signal θr is not 90 degrees or 270 degrees, the switch 651s again outputs the signal on the input terminal B, that is, the signal output by the switch 651s itself one cycle before.

Thus, the switch 651s updates the output only when the rotation angle signal θr is 90 degrees or 270 degrees, and holds the current output otherwise.

When the rotation angle signal θr is 90 degrees or 270 degrees, the output of the switch 651s is given as below, respectively.

$$\sqrt{S(90°) \cdot S(90°)} = \sqrt{K_1 \sin(90°) \cdot K_1 \sin(90°)} = K_1 \quad (34)$$

$$\sqrt{S(270°) \cdot S(270°)} = \sqrt{K_1 \sin(270°) \cdot K_1(270°)} = K_1 \quad (35)$$

Similarly, the switch 651t has the two input terminals A and B. The output of the square root calculator 451n is input to the input terminal A. The signal output one cycle before by the switch 651t is again input to the input terminal B through the delay device 651E. Moreover, the rotation angle signal θr is input to the switch 651t as the signal for determination.

When the rotation angle signal θr is 0 degrees or 180 degrees, the switch 651t outputs the signal on the input terminal A, that is, the output signal of the square root calculator 451n.

Moreover, when the rotation angle signal θr is not 0 degrees or 180 degrees, the switch 651t again outputs the signal on the input terminal B, that is, the signal output by the switch 651t itself one cycle before.

Thus, the switch 651t updates the output only when the rotation angle signal θr is 0 degrees or 180 degrees, and holds the current output otherwise.

When the rotation angle signal θr is 0 degrees or 180 degrees, the output of the switch 651t is given as below, respectively.

$$\sqrt{C(0°) \cdot C(0°)} = \sqrt{K_2 \cos(0°) \cdot K_2 \cos(0°)} = K_2 \quad (36)$$

$$\sqrt{C(180°) \cdot C(180°)} = \sqrt{K_2 \cos(180°) \cdot K_2 \cos(180°)} = K_2 \quad (37)$$

Thus, the output of the divider 451o, that is, the amplitude ratio signal TMP2 output by the amplitude ratio calculation unit 651 is always $K_1/K_2$ as given below, and thus matches Expression (29)

$$TMP2 = \frac{K_1}{K_2} \quad (38)$$

Thus, the amplitude ratio calculation unit 651 in the sixth embodiment can generate the amplitude ratio signal TMP2=$K_1/K_2$ while the amplitude ratio calculation unit 651 does not include the low-pass filters included in the fourth and fifth embodiments.

As described above, according to the sixth embodiment of the present invention, the amplitude ratio calculation unit includes: a second multiplier configured to calculate the second power of the sine signal; a third multiplier configured to calculate the second power of the cosine signal; a fifth switch connected at a subsequent stage of the second multiplier, which is configured to update an output only when the rotation angle of the rotating body calculated by the second rotation angle calculation unit is 90 degrees or 270 degrees, and to hold a current output when the rotation angle of the rotating body calculated by the second rotation angle calculation unit is not 90 degrees or 270 degrees; and a sixth switch connected at a subsequent stage of the third multiplier, which is configured to update an output only when the rotation angle of the rotating body calculated by the second rotation angle calculation unit is 0 degrees or 180 degrees, and to hold a current output when the rotation angle of the rotating body calculated by the second rotation angle calculation unit is not 0 degrees or 180 degrees.

As a result, the amplitude ratio signal TMP2 can be generated while the low-pass filters are not included as in the fourth and fifth embodiments, and a component cost and an amount of calculation can thus be reduced compared with the fourth and fifth embodiments. Moreover, the amplitude ratio between the sine signal S(θ) and the cosine signal C(θ) is highly precisely improved without depending on the rotational speed ωr of the motor as in the fifth embodiment. Accordingly, the rotation angle errors of 2f can more reliably be suppressed.

Seventh Embodiment

Figure 15:
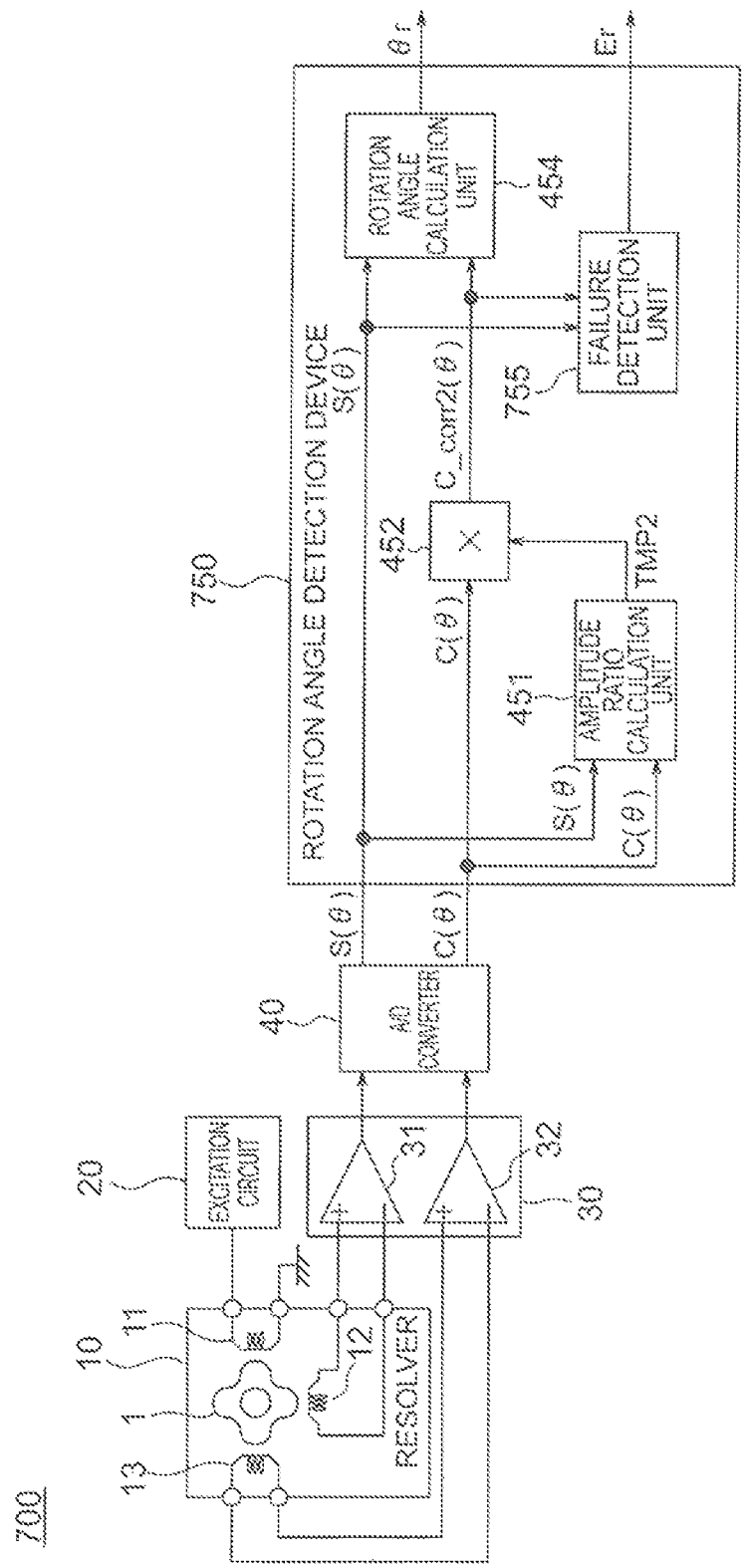
FIG. 15 is a block diagram for illustrating a configuration of a rotation angle detection system including a rotation angle detection device according to a seventh embodiment of the present invention.

FIG. 15 is a block diagram for illustrating a configuration of a rotation angle detection system 700 including a rotation angle detection device 750 according to a seventh embodiment of the present invention.

The rotation angle detection device 750 according to the seventh embodiment further includes a failure detection unit 755 configured to detect a failure of the motor in addition to the configuration of the rotation angle detection device 4510 according to the fourth embodiment.

The failure detection unit 755 calculates a square-sum W of the sine signal S(θ) and the cosine signal C_corr2(θ) which is output from the multiplication unit 452, and has the amplitude that has been corrected.

The square-sum W calculated by the failure detection unit 755 is calculated as given below by Expression (23), Expression (24), and Expression (30)

$$W = S(\theta)^2 + C\_corr2(\theta)^2 \quad (39)$$
$$= \frac{1}{2}K_1^2(1 - \cos(2\theta)) + \frac{1}{2}K_1^2(1 + \cos(2\theta))$$
$$= K_1^2$$

Thus, even when the amplitude $K_1$ of the sine signal S(θ) and the amplitude $K_2$ of the cosine signal C(θ) are different from each other, the square-sum 21 does not depend on the value of $K_2$, and is determined by only the value of $K_1$.

The failure detection unit 755 determines that the motor is normal when the square-sum W is between a predetermined upper limit value and a predetermined lower limit value, and determines that the motor is abnormal otherwise.

When it is assumed that the sine signal S(θ) and the cosine signal C(θ) are directly input to the failure detection unit 755, the square-sum W calculated in this case is given as below.

$$W = S(\theta)^2 + C(\theta)^2 \qquad (40)$$
$$= \frac{1}{2}K_1^2(1 - \cos(2\theta)) + \frac{1}{2}K_2^2(1 + \cos(2\theta))$$
$$= \frac{1}{2}(K_1^2 + K_2^2) - \frac{1}{2}K_1^2\cos(2\theta) + \frac{1}{2}K_2^2\cos(2\theta)$$

Thus, when the amplitude $K_1$ of the sine signal S(θ) and the amplitude $K_2$ of the cosine signal C(θ) are different from each other, the square-sum W includes frequency components twice as high as the frequency of the fundamental wave of the cosine signal C(θ).

As a result, it is required to determine the upper limit value and the lower limit value of the failure detection device 755 in consideration of the frequency components twice as high as the frequency of the fundamental wave of the cosine signal C(θ), and a sufficient margin is required. Consequently, there occurs such a problem that a period of time required for the determination by the failure detection unit 755 is increased due to the margin.

In the seventh embodiment, as given by Expression (39), even when the amplitude $K_1$ of the sine signal S(θ) and the amplitude $K_2$ of the cosine signal C(θ) are different from each other, the square-sum W does not include the frequency components twice as high as the frequency of the fundamental wave of the cosine signal C(θ).

As a result, when the upper limit value and the lower limit value for the failure detection unit 755 are to be determined, it is not required to consider the frequency components twice as high as the frequency of the fundamental wave of the cosine signal C(θ), and the margin is thus not required. Accordingly, there does not occur the above-mentioned problem that the period of time required for the determination by the failure detection unit 755 is increased.

The rotation angle detection device 750 described above is configured to generate the amplitude ratio signal. TMP2 based on the respective second powers of the sine signal S(θ) and the cosine signal C(θ), multiply the amplitude ratio signal TMP2 by the cosine signal C(θ) and to detect the failure of the motor based on the square-sum W of the multiplication result C_corr2(θ) and the sine signal S(θ).

However, the configuration of the seventh embodiment is not limited to this example. The rotation angle detection device 750 may be configured to generate the amplitude ratio signal TMP2 based on the respective second powers of the sine signal S(θ) and the cosine signal C(θ), multiply the amplitude ratio signal TMP2 by the sine signal S(θ), and to detect the failure of the motor based on the square-sum W of a multiplication result S_corr2(θ) and the cosine signal C(θ).

In summary, according to the seventh embodiment of the present invention, the rotation angle detection device further includes a failure detection unit configured to detect a failure of the rotating body based on a square-sum of the output of the second multiplication unit and the other one of the sine signal or the cosine signal. As a result, the failure detection for the rotating body can be executed at high speed.

The failure detection unit 755 may calculate the square root of the square-sum W of the sine signal S(θ) and the cosine signal C_corr2 (θ) having the amplitude that has been corrected, and then execute the failure detection. Similarly, the failure detection unit 755 may calculate the square root of the square-sum W of the cosine signal C(θ) and the sine signal S_corr2(θ) having the amplitude that has been corrected, and then execute the failure detection.

Moreover, the failure detection unit 755 may execute the failure detection based on the sine signal S(θ), the cosine signal C(θ), and the amplitude ratio $K_1/K_2$ calculated by the amplitude ratio calculation unit 451.

Eighth Embodiment

Figure 16:
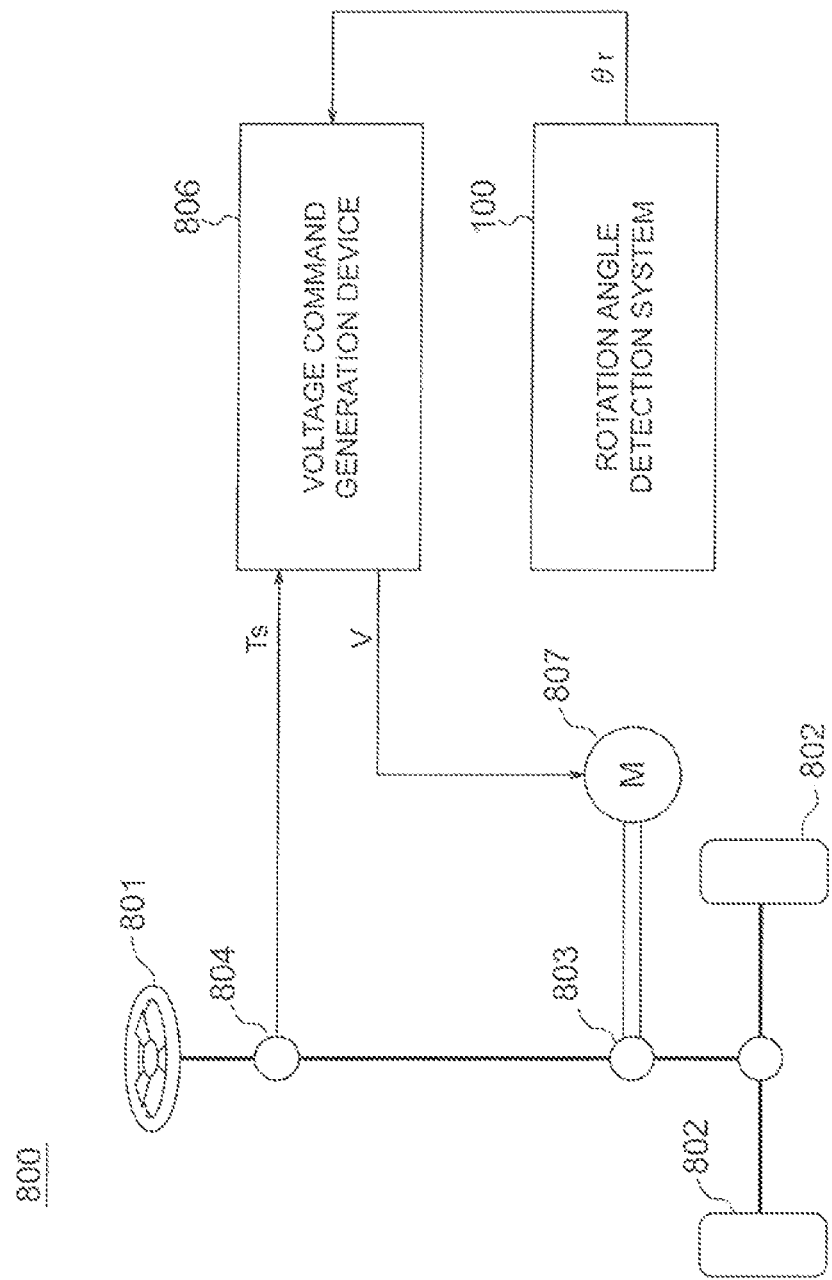
FIG. 16 is a block diagram for illustrating a configuration of an electric power steering device according to an eighth embodiment of the present invention.

FIG. 16 is a block diagram for illustrating a configuration of an electric power steering device 800 according to an eighth embodiment of the present invention.

The electric power steering device 800 according to the eighth embodiment is configured to generate an assist torque for assisting a steering torque of a steering system of a vehicle based on the rotation angle signal θr output from the rotation angle detection system 100 in the first embodiment.

The electric power steering device 800 includes the rotation angle detection system 100, a steering wheel 801, front wheels 802, gears 803, a torque detector 804, a voltage command generation device 806, and an AC motor 807.

The AC motor 807 generates the assist torque for assisting the steering torque of the steering system through intermediation of the gears 803.

The rotation angle detection system 100 detects the rotation angle of the AC motor 807, and outputs the rotation angle signal θr.

A driver of the vehicle operates the steering wheel 801, to thereby steer the front wheels 802.

The torque detector 804 detects a steering torque Ts of the steering system.

The voltage command generation device 806 determines a drive voltage V to be applied to the AC motor 807 based on the steering torque Ts detected by the torque detector 804 and on the rotation angle signal θr output from the rotation angle detection system 100.

In detail, first, the voltage command generation device 806 calculates a current command value for the AC motor 807 based on the steering torque Ts. After that, the voltage command generation device 806 calculates a voltage command value based on the current command value and the rotation angle signal θr. Finally, the voltage command generation device 806 controls a power converter, for example, an inverter, based on the voltage command value, to thereby determine a drive voltage V to be applied to the AC motor 807.

In order to achieve the above-mentioned control, it is only required to use a publicly-known technology of, for example, independently providing a current sensor configured to detect the current flowing through the AC motor 807, and calculating the voltage command value based on a difference between the current command value and a detection value of the current sensor.

In general, in the electric power steering device, detection precision of the rotation angle of the AC motor 807 is important.

For example, it is assumed that rotation angle errors of 2f occur between the rotation angle signal θr output from the rotation angle detection system 100 and the actual rotation angle θ of the AC motor 807. In this case, the voltage command generation device 806 applies the drive voltage V including the rotation angle errors of 2f to the AC motor. As a result, components of the rotation angle errors of 2f are mixed with the torque to be generated by the AC motor 807, resulting in occurrence of ripples, vibration, noise, and the like.

Thus, in the electric power steering device, the precision of the rotation angle signal θr output from the rotation angle detection system 100 is very important. In the eighth embodiment, the rotation angle signal θr can highly precisely be calculated by using the rotation angle detection system 100 in the first embodiment.

Even when the rotation angle detection systems in the second to seventh embodiments are used in place of the rotation angle detection system 100 in the first embodiment, effects equivalent to or higher than those of the eighth embodiment can be obtained.

Moreover, in the first to eighth embodiments described above, the resolver is used as means for detecting the rotation angle of the motor. However, the applicable range of the first to eighth embodiments is not limited to the resolver. The first to eighth embodiments can similarly be applied to another detection means for outputting the sine signal and the cosine signal corresponding to the rotation angle of the motor, such as an MR sensor and an encoder.

Figure 17:
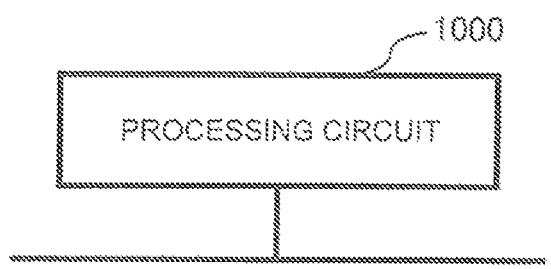
FIG. 17 is a configuration diagram for illustrating a case in which each function of the rotation angle detection devices according to the first to eighth embodiments of the present invention is implemented by a processing circuit which is dedicated hardware.
Figure 18:
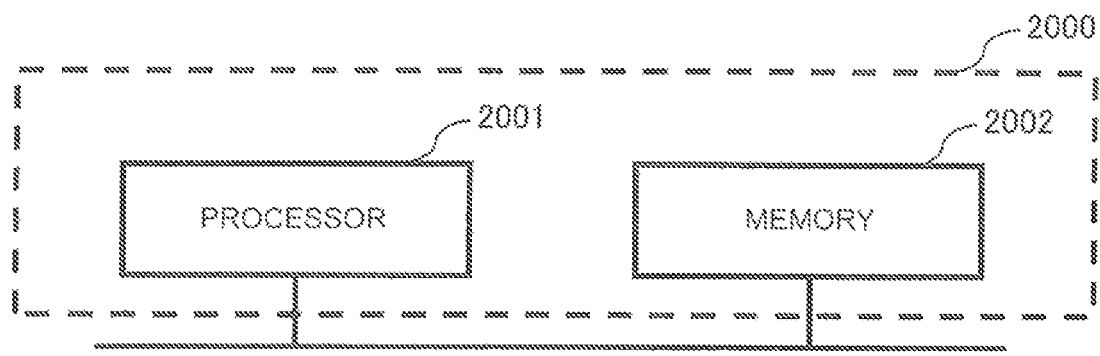
FIG. 18 is a configuration diagram for illustrating a case in which each function of the rotation angle detection devices according to the first to eighth embodiments of the present invention is implemented by a processing circuit which includes processor and a memory.

Moreover, each function of the rotation angle detection devices according to the first to eighth embodiments described above is implemented by a processing circuit. The processing circuit configured to implement each function may be dedicated hardware or a processor configured to execute a program stored in a memory. FIG. 17 is a configuration diagram for illustrating a case in which each function of the rotation angle detection devices according to the first to eighth embodiments of the present invention is implemented by a processing circuit 1000 which is dedicated hardware. Moreover, FIG. 18 is a configuration diagram for illustrating a case in which each function of the rotation angle detection devices according to the first to eighth embodiments of the present invention is implemented by a processing circuit 2000 which includes a processor 2001 and a memory 2002.

When the processing circuit is dedicated hardware, the processing circuit 1000 corresponds to, for example, a single circuit, a composite circuit, a programmed processor, a parallel-programmed processor, an application specific integrated circuit (ASIC), field programmable gate array (FPGA), or a combination thereof. The function of each of the units of the rotation angle detection device may be implemented by an individual processing circuit 1000, or the functions of the respective units may be implemented collectively by the processing circuit 1000.

Meanwhile, when the processing circuit is the processor 2001, the functions of the respective units of the rotation angle detection device are implemented by software, firmware, or a combination of software and firmware. The software and the firmware are written as programs, and stored in the memory 2002. The processor 2001 reads out and executes the program stored in the memory 2002, to thereby implement the function of each unit. That is, the rotation angle detection device includes the memory 2002 for storing programs for causing the above-mentioned respective control procedures to be executed resultantly when being executed by the procession circuit 2000.

In other words, those programs cause the computer to execute the above-mentioned procedures or methods for the respective units. In this case, the memory 2002 corresponds to, for example, a random access memory (RAM), a read only memory (ROM), a flash memory, an erasable programmable read only memory (EPROM), an electrically erasable and programmable read only memory (EEPROM), or other such non-volatility or volatile semiconductor memory. Further, the memory 2002 also corresponds to a magnetic disk, a flexible disk, an optical disc, a compact disc, a MiniDisk, a DVD, or the like.

Some parts of the functions of the respective units described above may be implemented by dedicated hardware, and other parts thereof may be implemented by software or firmware.

In this manner, the processing circuit can implement the functions of the respective units described above by hardware, software, firmware, or a combination thereof.

REFERENCE SIGNS LIST

50, 350, 450, 650, 750 rotation angle detection device, 51, 251, 351 intermediate signal generation unit, 451, 551, 651 amplitude ratio calculation unit, 51*a* multiplier (first multiplier), 51*b* low-pass filter (first low-pass filter), 251*d* rotational speed calculator (first rotational speed calculator), 251*f* switch (first switch), 351*f* switch (second switch), 451*g* multiplier (second multiplier), 451*h* multiplier (third multiplier), 451*i* low-pass filter (second low-pass filter), 451*j* low-pass filter (third low-pass filter), 551*p* rotational speed calculator (second rotational speed calculator), 551*s* switch (third switch), 551*t* switch (fourth switch), 651*s* switch (fifth switch), 651*t* switch (sixth switch), 52 multiplication unit (first multiplication unit), 452 multiplication unit (second multiplication unit), 53 addition unit (addition/subtraction unit), 54 rotation angle calculation unit (first rotation angle calculation unit), 454 rotation angle calculation unit (second rotation angle calculation unit), 755 failure detection unit, 800 electric power steering device, 807 AC motor (rotating body), S(θ) sine signal, C(θ) cosine signal, TMP1 intermediate signal, TMP2 amplitude ratio signal (amplitude ratio), θr rotation angle signal.

The invention claimed is:

1. A power steering system comprising:
   a motor; and
   a rotation angle detection device, the rotation angle detection device comprising:
      a plurality of coils for detecting a sine signal and a cosine signal;
      an intermediate signal generator using a processor to generate an intermediate signal based on a product of the sine signal and the cosine signal which are based on a rotation angle of a rotating body;
      a first multiplication circuitry using the processor to multiply the intermediate signal by one of the sine signal or the cosine signal;
   an addition/subtraction circuitry using the processor to add the other one of the sine signal or the cosine signal and an output of the first multiplication circuitry to each other or to subtract the output of the first multiplication circuitry from the other one of the sine signal or the cosine signal; and
      a first rotation angle calculator using the processor to calculate the rotation angle of the rotating body based on the one of the sine signal or the cosine signal and on an output of the addition/subtraction circuitry;
      wherein the rotation angle detection device provides an input for a voltage command, the voltage command being applied to the motor to control the motor, wherein the voltage command is based on the rotation angle, and the motor is the rotating body.

2. The power steering system according to claim 1, wherein the intermediate signal generator includes:

a first multiplier configured to calculate the product of the sine signal and the cosine signal; and a first low-pass filter configured to remove frequency components equal to or higher than twice a frequency of fundamental waves of the sine signal and the cosine signal from an output of the first multiplier.

3. The power steering system according to claim 2, wherein the intermediate signal generator further includes:

a first rotational speed calculator using the processor to calculate a rotational speed of the rotating body; and a switch connected at a subsequent stage of the first low-pass filter, which is configured to update an output only when the rotational speed of the rotating body is equal to or higher than a predetermined rotational speed threshold value, and to hold a current output when the rotational speed of the rotating body is lower than the predetermined rotational speed threshold value.

4. The power steering system according to claim 1, wherein the intermediate signal generator further includes:

a first multiplier using the processor to calculate the product of the sine signal and the cosine signal; and a switch connected at a subsequent stage of the first multiplier, which uses the processor to update an output only when the rotation angle of the rotating body calculated by the first rotation angle calculator is 90 degrees or 270 degrees, and to hold a current output when the rotation angle of the rotating body calculated by the first rotation angle calculator is not 90 degrees or 270 degrees.

5. A rotation angle detection device for detecting a sine signal and a cosine signal, comprising:

an intermediate signal generator using processing circuitry to generate an intermediate signal based on a product of the sine signal and the cosine signal which are based on a rotation angle of a rotating body;

a first multiplication circuitry using the processing circuitry to multiply the intermediate signal by one of the sine signal or the cosine signal;

an addition/subtraction circuitry using the processing circuitry to add the other one of the sine signal or the cosine signal and an output of the first multiplication circuitry to each other or to subtract the output of the first multiplication circuitry from the other one of the sine signal or the cosine signal; and a first rotation angle calculator using the processing circuitry to calculate the rotation angle of the rotating body based on the one of the sine signal or the cosine signal and on an output of the addition/subtraction circuitry;

wherein the rotation angle detection device provides an input for a voltage command, the voltage command being applied to a motor to control the motor, wherein the voltage command is based on the rotation angle, and the motor is the rotating body.

* * * * *